United States Patent [19]
Grimshaw et al.

[11] Patent Number: 5,114,519
[45] Date of Patent: May 19, 1992

[54] METHOD FOR LAYING CUT COMPOSITE TAPE ON A MOLD HAVING SCRAP REMOVAL

[75] Inventors: Michael N. Grimshaw, Milford; Stephen J. Albers, Norwood; Ralph J. Rust, Cheviot, all of Ohio

[73] Assignee: Cincinnati Milacron Inc., Cincinnati, Ohio

[21] Appl. No.: 580,402

[22] Filed: Sep. 10, 1990

Related U.S. Application Data

[62] Division of Ser. No. 380,573, Jul. 17, 1989, Pat. No. 4,978,417.

[51] Int. Cl.⁵ .............................................. B32B 31/18
[52] U.S. Cl. ..................................... 156/235; 156/230; 156/238; 156/256; 156/264; 156/265; 156/267; 156/270
[58] Field of Search ............... 156/230, 235, 238, 344, 156/250, 256, 264, 265, 267, 270

[56] References Cited

U.S. PATENT DOCUMENTS

| | | | |
|---|---|---|---|
| 3,996,089 | 12/1976 | More et al. | 156/235 |
| 4,285,752 | 8/1981 | Higgins | 156/265 X |
| 4,531,992 | 7/1985 | Eaton | 156/152 |
| 4,557,783 | 12/1985 | Grone et al. | 156/257 |
| 4,627,886 | 12/1986 | Grone et al. | 156/361 |

OTHER PUBLICATIONS

Klein, Allen J., "Automated Tape Laying", *Advanced Composites*, Jan./Feb. 1989, pp. 44-52.
Ewald, Glenn W., "Two Stage Tape Placement Machine", 40th Annual Conference, Reinforced Plastics/Composites Institute, The Society of the Plastics Industry, Inc., Jan. 28-Feb. 1, 1985, Section 19-C pp. 1-5.

*Primary Examiner*—Jeff H. Aftergut
*Attorney, Agent, or Firm*—Thomas M. Farrell; Frank C. Leach, Jr.

[57] ABSTRACT

A composite tape laying machine removes each severed portion of a composite tape of a tape assembly from its backing that is not to be applied to a mold or the like. A removal tape of a material, which has a greater adherence to the composite tape than the backing has to the composite tape to which the composite tape is releasably adhered, is moved into engagement with each non-selected severed portion at least at the start of each non-selected severed portion. When the non-selected severed portion has a varying width, the removal tape is removed from engagement with the non-selected severed portion at the start of its maximum width. When the non-selected severed portion has a constant width, the removal tape is removed from engagement therewith substantially prior to the termination of the non-selected severed portion.

7 Claims, 15 Drawing Sheets

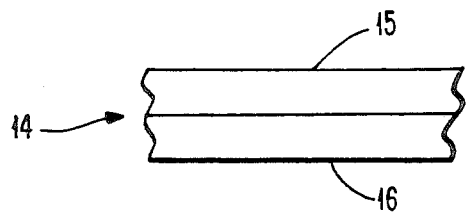
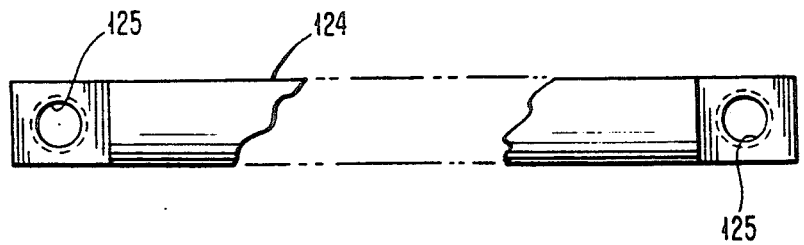
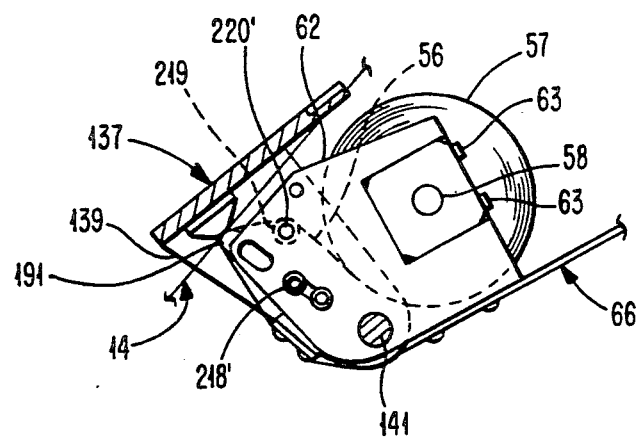

| FIG. 9A | FIG. 9B |

METHOD FOR LAYING CUT COMPOSITE TAPE ON A MOLD HAVING SCRAP REMOVAL

This is a divisional of copending application(s) Ser. No. 07/380,573 filed on Jul. 17, 1989, now U.S. Pat. No. 4,978,411.

This invention relates to a composite tape laying machine in which inadvertent application of scrap portions of the composite tape to a mold or the like is prevented and a method and, more particularly, to a composite tape laying machine in which scrap portions of the composite tape are removed prior to application of the selected portions of the composite tape to the mold or the like while minimizing the scrap portions and a method.

Each of U.S. Pat. No. 4,557,783 to Grone et al and U.S. Pat. No. 4,627,886 to Grone et al discloses a composite tape laying machine. Each of the aforesaid Grone et al patents is incorporated by reference.

In the aforesaid Grone et al patent, U.S. Pat. No. 4,557,783, the discarded or scrap portions of tape are returned with the backing to a take-up reel on which the backing is wound. Thus, the scrap portions, which are severed from the remainder of the composite tape prior to application of each selected severed portion to a mold or the like, are returned to the take-up reel with the backing.

To apply portions of the composite tape to the mold, it is necessary to selectively sever the composite tape on the backing to have each selected severed portion of a desired shape and length. Many of these selected portions are cut other than perpendicular to the longitudinal axis of the fibers of the composite tape. As a result, it is necessary to provide spacing between each of the selected severed portions that is to be applied to the mold by having a non-selected severed portion of the composite tape therebetween. Accordingly, this has resulted in a waste of the composite tape and increased the cost of manufacture.

Furthermore, when the discarded or scrapped composite tape portions remain on the backing at the location of application of each selected severed portion of the composite tape to the mold, there have been instances in which the discarded or scrapped portions of the composite tape are removed by the tape applicator shoe and inadvertently applied to the mold. To avoid this, the severed composite tape portions, which are to be discarded or scrapped, must be removed prior to application of each selected severed portion of the composite tape to the mold.

One previously suggested arrangement for handling the discarded or scrapped portions of the composite tape is disclosed in U.S. Pat. No. 4,531,992 to Eaton. The aforesaid Eaton patent removes each selected severed portion of the composite tape from its backing and applies it to a carrier belt, which transports the selected severed portions for application to a mold by a pressure roller. While the aforesaid Eaton patent has the discarded or scrapped portions of the composite tape removed prior to application of the selected severed portions, it has the disadvantage of substantially increasing the cost of manufacture by the user. This is because of the application of the selected severed portions of the composite tape to the carrier belt.

The present invention satisfactorily solves the problem of preventing each non-selected severed portion of the composite tape from remaining on the backing at the location at which the selected severed portions of the composite tape are applied to the mold and minimizes the amount of material in each non-selected severed portion. This reduces the cost since there is a substantial reduction, at least fifty per cent, in waste of the composite tape in comparison with the prior systems in which the non-selected severed portions remained on the backing.

The present invention utilizes computer software to program when the composite tape is severed without the backing being severed. The computer program minimizes the area of each non-selected severed portion of the composite tape between selected portions. Thus, the area of each non-selected severed portion is reduced through the use of the computer program while still removing each non-selected severed portion from the backing prior to where the selected severed portions of the composite tape are applied to the mold.

The present invention applies a material, which has a greater adherency to the composite tape than the backing has to the composite tape, to each non-selected severed portion of the composite tape. Thus, each non-selected severed portion of the composite tape will adhere to the material of greater adherency and be removed from the backing to which it is removably adhered when the material of greater adherency is applied with a force to the non-selected severed portion of the composite tape.

To enable the material of greater adherency to be moved into engagement with each non-selected severed portion of the composite tape and have each non-selected severed portion of the composite tape adhere thereto, an element is disposed along a predetermined path of the tape assembly, which includes the backing and the composite tape, adjacent the backing. The element has a curved surface tangent to the backing so that there is substantially a line contact when the material of greater adherency is applied to each non-selected severed portion of the composite tape. Therefore, the material of greater adherency can be applied to the composite tape at the start of each non-selected severed portion even if the non-selected severed portion is of a very slight width at its start.

It is necessary for the material of greater adherency to cease to be applied to the composite tape when each non-selected severed portion has its maximum width if the non-selected severed portion is of a varying width. When the non-selected severed portion has a constant width for a substantial length, it is necessary to move the material of greater adherency out of engagement with the composite tape substantially prior to the end of the non-selected severed portion and preferably at least fifty per cent of the length of the non-selected severed portion prior to its end.

The present invention has the material of greater adherency in the form of a tape, which is advanced into engagement with each non-selected severed portion by a contact roller extending across the entire width of the composite tape or by a plurality of separate fingers, which are separately moved, with the total width of the fingers equal to that of the contact roller. In either arrangement, the removal tape with the material of greater adherency is wound upon a take-up reel, which is selectively driven, to advance the removal tape from a supply reel adjacent the contact roller or the fingers.

The take-up reel is mounted on a unique support arrangement. This unique support arrangement enables the take-up reel to be rotated while the support arrangement may be disconnected from its drive so that the take-up reel can be easily removed from the support for replacement.

An object of this invention is to provide an apparatus and method for removing non-selected severed portions of a composite tape, which is adhered to a backing of a tape assembly, prior to when selected severed portions of the composite tape are applied to a mold or the like.

Another object of this invention is to provide an apparatus and method for minimizing the area of each non-selected severed portion of a composite tape, which is adhered to a backing of a tape assembly.

A further object of this invention is to provide a unique support arrangement for a take-up reel for a removal tape used in removing each non-selected severed portion of the composite tape from its backing.

Other objects of this invention will be readily perceived from the following description, claims, and drawings.

The attached drawings illustrate preferred embodiments of the invention, in which:

FIG. 8 is an enlarged fragmentary side elevational view of a portion of a tape assembly formed of a composite tape and a backing;

FIG. 9A is a plan view, partly in section, of a portion of the composite tape laying machine of FIG. 1A showing the arrangement for driving a cutter with the cutter in its cutting position and taken along line 9—9 of FIG. 1A;

FIG. 13 is a fragmentary plan view of a shaft for supporting a contact roller for the removal tape;

FIG. 19 is a fragmentary schematic side elevational view, partly in section, showing another embodiment in which a finger assembly having a plurality of separately movable fingers is employed for selectively moving selected portions of the removal tape into engagement with each non-selected severed portion of the composite tape in accordance with the width of each non-selected severed portion;

Figure 1A:
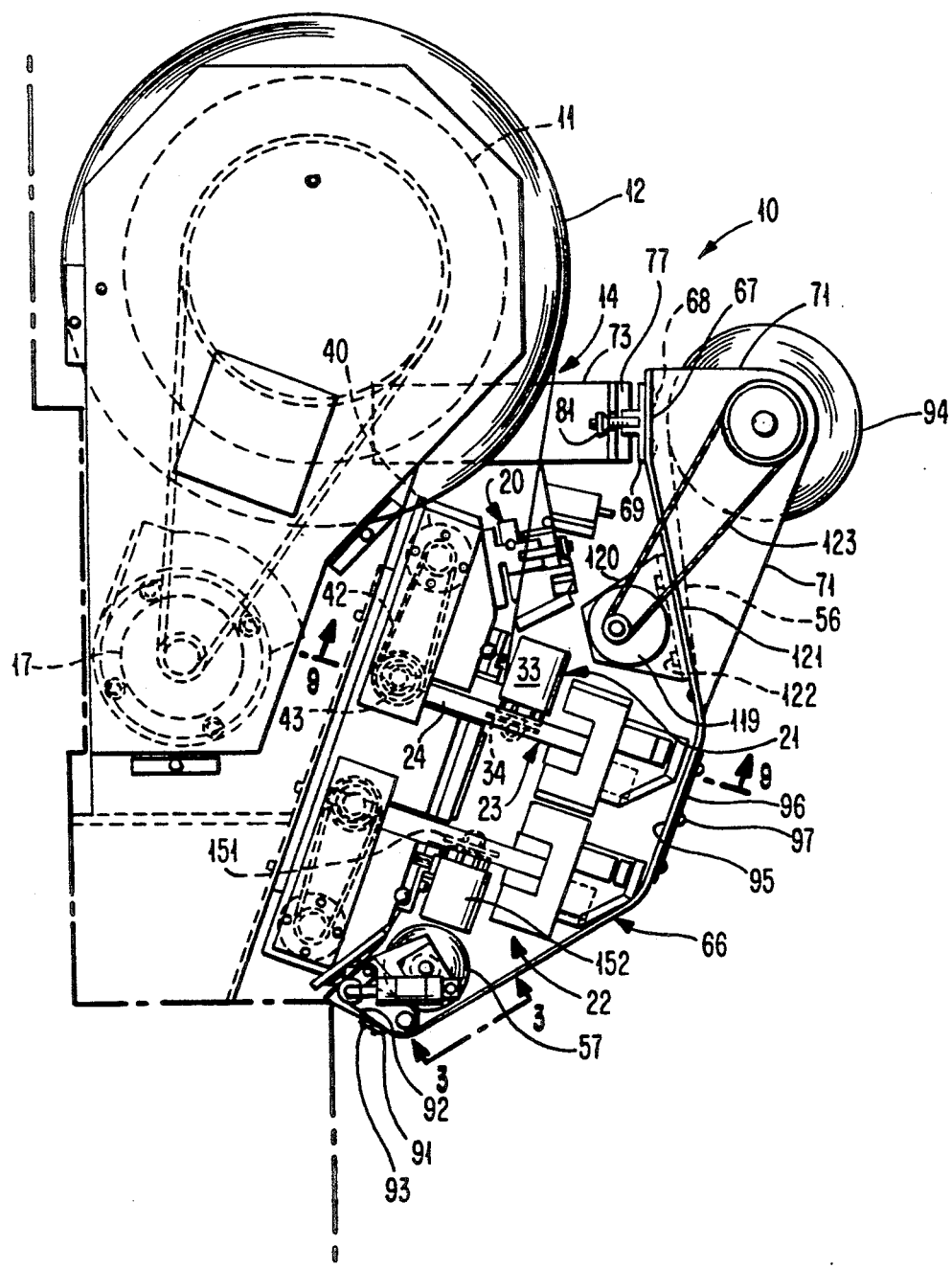
FIG. 1A is a side elevational view of a portion of a composite tape laying machine having an arrangement for removing non-selected severed portions of a composite tape prior to application of selected severed portions of the composite tape to a mold or the like and with some parts omitted for clarity purposes.
Figure 2:
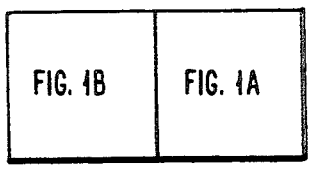
FIG. 2 is a block diagram showing the relationship of FIG. 1A and FIG. 1B.

Referring to the drawings and particularly FIG. 1A, there is shown a portion of a composite tape laying machine 10 such as shown in the aforesaid Grone et al patent, U.S. Pat. No. 4,627,886, for example. The composite tape laying machine 10 includes a rotatably mounted supply reel 11 supporting a spool 12 around which is wound a tape assembly 14.

As shown in FIG. 8, the tape assembly 14 includes a composite tape 15 and a backing 16. The composite tape 15 may by any type of composite material such as described in the aforesaid Grone et al patent, U.S. Pat. No. 4,627,886, in which the fibers extend longitudinally, for example. The backing 16 is formed of a material to which the composite tape 15 adheres. One suitable example of the backing 16 is a release paper sold by Akrosil, Menasha, Wis. as Silox release liner.

The supply reel 11 (see FIG. 1A) is driven by a motor 17 to advance the tape assembly 14 therefrom or rewind the tape assembly 14 thereon. The tape assembly 14 is advanced from the supply reel 11 along a predetermined path at a selected speed.

The backing 16 (see FIG. 8) of the tape assembly 14 extends to a rotatably mounted back-up reel 18 (see FIG. 1B), which is driven by a motor 19. The motors 17 (see FIG. 1A) and 19 (see FIG. 1B) are controlled by a part specific computer program so that the tape assembly 14 is advanced at a desired speed from the spool 12 (see FIG. 1A) or rewound on the spool 12 at a desired speed.

During its advancement along the predetermined path, the tape assembly 14 enters an upper tape guide chute assembly 20 prior to passing a first cutter assembly 21. A second cutter assembly 22 is disposed further along the predetermined path of the tape assembly 14 so that the tape assembly 14 moves past the second cutter assembly 22 after passing the first cutter assembly 21 when the tape assembly 14 is advanced from the spool 12 to the back-up reel 18 (see FIG. 1B). Each of the first cutter assembly 21 (see FIG. 1A) and the second cutter assembly 22 is the same.

If there is to be only a single cut of the composite tape 15 (see FIG. 8) during severing of the composite tape 15, only the second cutter assembly 22 (see FIG. 1A) is employed. If cuts are to be made on opposite side edges of the composite tape 15 (see FIG. 8), the first cutter assembly 21 (see FIG. 1A) is initially used to make the first cut on one side edge of the composite tape 15 (see FIG. 8), and the second cutter assembly 22 (see FIG. 1A) is employed to make the second cut on the opposite side edge of the composite tape 15 (see FIG. 8) after the first cut has been completed.

Figure 9:
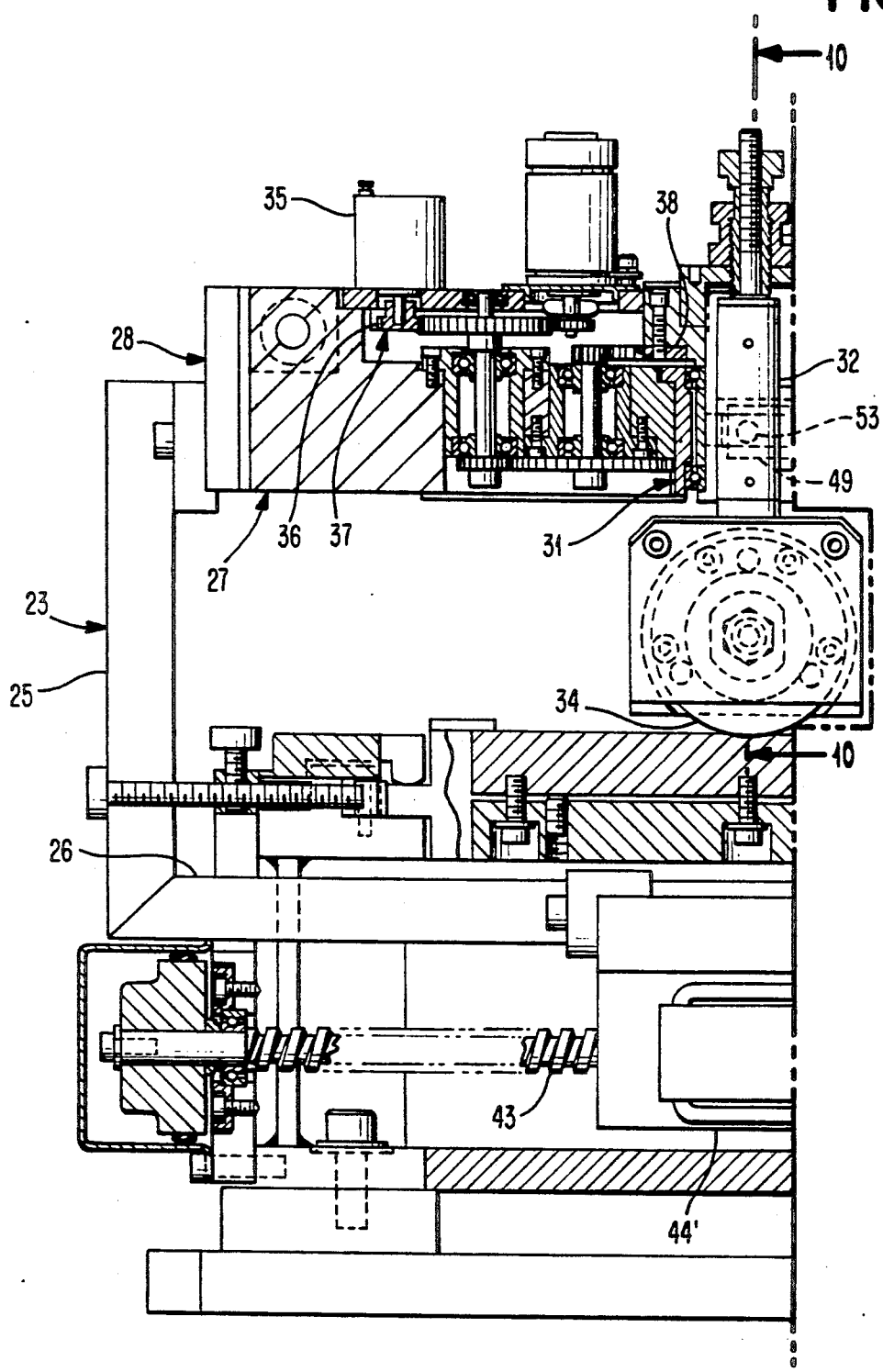
FIG. 9 is a block diagram showing the relationship of FIGS. 9A and 9B.

Since each of the first cutter assembly 21 (see FIG. 1A) and the second cutter assembly 22 is the same, only the first cutter assembly 21 will be described. The first cutter assembly 21 includes a hollow tubular frame 23. The frame 23 has one end of each of a pair of parallel arms 24 and 25 (see FIG. 9A) joined together by a bar 26.

The frame 23 has a body 27 (see FIG. 9B) connected thereto. One end of the body 27 is pivotally connected to a bracket 28 (see FIG. 9A) welded to the other end of the arm 25 of the frame 23. The other end of the body 27 is releasably connected by a swing bolt 29 (see FIG. 9B) to a bracket 30 welded to the other end of the arm 24 on the frame 23.

Figure 10:
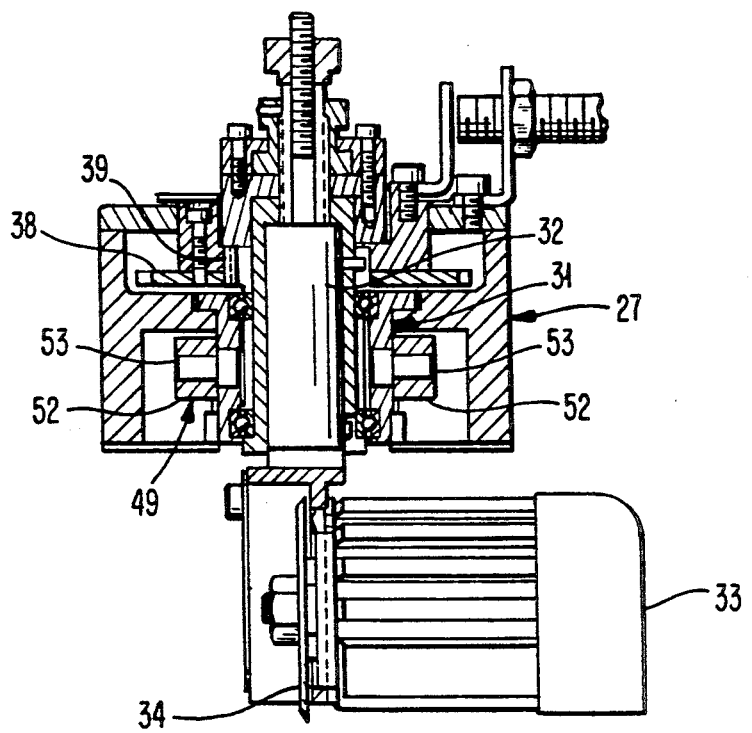
FIG. 10 is a sectional view, partly in elevation, of a portion of the composite tape laying machine of FIG. 9A showing the arrangement for moving the cutter of FIG. 9A into its cutting position and taken along line 10—10 of FIG. 9A.

The body 27 slidably supports a housing 31 (see FIG. 9A) within which a shaft 32 is rotatably supported. The shaft 32 has a motor 33 (see FIG. 10) supported thereby for movement therewith. The motor 33 has a rotary carbide cutter 34 attached to its shaft so that the cutter 34 will cut the composite tape 15 (see FIG. 8) when the motor 33 (see FIG. 1A) rotates the cutter 34.

The angle at which the cutter 34 moves across the composite tape 15 (see FIG. 8) is selected in accordance with the angle at which the cut is to be made. This angle is selected by energization of a motor 35 (see FIG. 9A), which is supported by the housing 31. The motor 35, which is under control of a computer program, has its shaft connected to an input gear 36 of a gear train 37. The gear train 37 has its output gear 38 connected to the shaft 32 through a pin 39 (see FIG. 10) to cause rotation of the shaft 32 when the motor 35 (see FIG. 9A) is energized. The rotation of the shaft 32 changes the orientation of the cutter 34 so that it may be rotated approximately 90° from the position shown in FIG. 1A.

The speed at which the cutter 34 moves across the composite tape 15 (see FIG. 8) is in accordance with the angle at which the cut is to be made since the tape assembly 14 continues to move during cutting unless the cut is perpendicular to the path of travel of the composite tape 15. The speed of advancement of the cutter 34 (see FIG. 1A) across the composite tape 15 (see FIG. 8) is controlled by the speed of an electric servo motor 40 (see FIG. 1A), which is under the control of a computer program.

Figure 7:
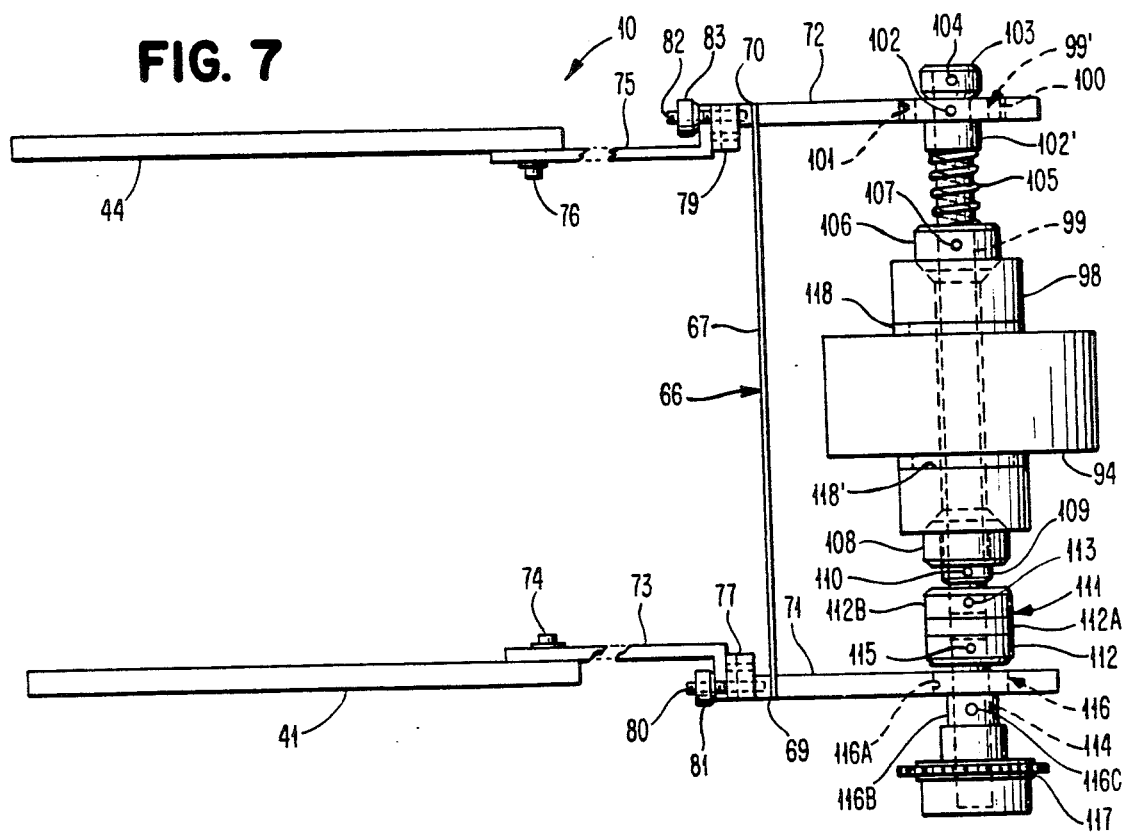
FIG. 7 is a top plan view of a take-up reel support arrangement for the removal tape to which each non-selected severed portion of the composite tape adheres with parts omitted for clarity purposes.
Figure 9B:
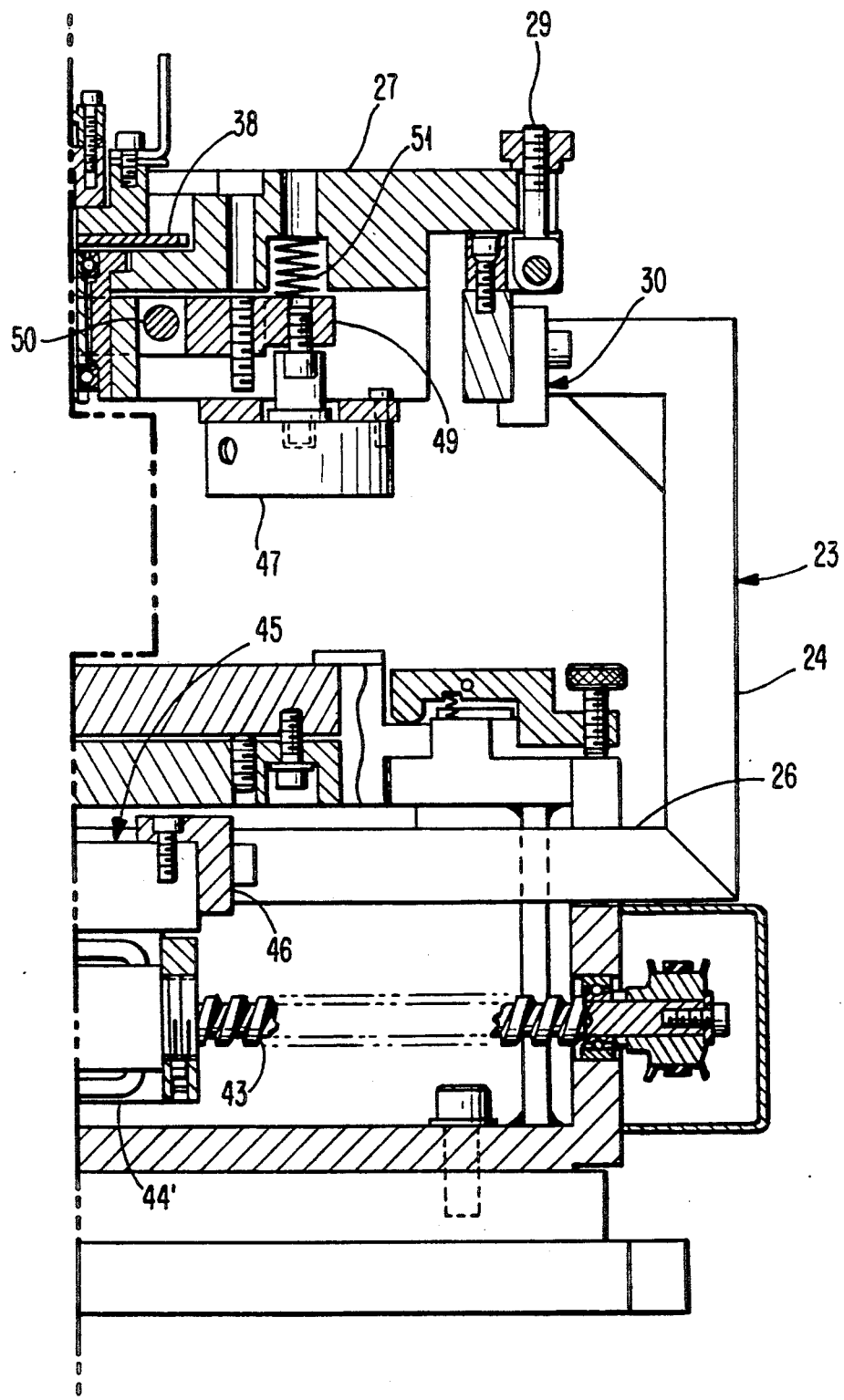
FIG. 9B is a plan view, partly in section, of the remainder of the portion of the composite tape laying machine of FIG. 1A showing the arrangement for driving a cutter with the cutter in its cutting position and taken along line 9—9 of FIG. 1A.

The electric servo motor 40, which is mounted on a side plate 41 (see FIG. 7) of the composite tape laying machine 10, is connected by a precision timing belt 42 (see FIG. 1A) to a ball screw 43, which is rotatably supported in the side plate 41 (see FIG. 7) and a side plate 44 of the composite tape laying machine 10. As shown in FIG. 9B, the ball screw 43 drives its ball nut 44' to which a carriage 45 is attached to the bar 26 of the hollow tubular frame 23 through a bracket 46, which is welded to the bar 26, so that the cutter 34 (see FIG. 9A) is precisely advanced at a precise speed relative to the speed of the composite tape 15 (see FIG. 8).

The cutter 34 (see FIG. 9A) is advanced automatically into its cutting position by an air cylinder 47 (see FIG. 9B) receiving pressurized air through a solenoid valve (not shown) being energized under control of the computer program. The air cylinder 47, which is supported by the body 27, has its piston rod connected to a yoke 49, which is pivotally mounted on a shaft 50 supported by the body 27.

The activation of the air cylinder 47 causes counterclockwise rotation of the yoke 49 against the force of a spring 51, which is supported in the body 27. The yoke 49 has its bifurcated ends 52 (see FIG. 10) receiving pins 53 supported on the housing 31 so that counterclockwise (as viewed in FIG. 9B) rotation of the yoke 49 produces slidable movement of the housing 31 (see FIG. 9A) within the body 27. This causes the shaft 32 to be slidably moved to the position of FIG. 9A in which the cutter 34 is disposed in its cutting position for cutting the composite tape 15 (see FIG. 8).

When the cutting operation is completed, the solenoid valve (not shown), which controls the air cylinder 47 (see FIG. 9B), is deenergized by the computer program to relieve the air pressure within the air cylinder 47. When this occurs, the spring 51 acts on the yoke 49 to pivot the yoke 49 clockwise to withdraw the cutter 34 (see FIG. 9A) from its cutting position.

The automatic advancement of the cutter 34 into its cutting position is controlled so that the backing 16 (see FIG. 8) of the tape assembly 14 is not cut by the cutter 34 (see FIG. 1A). The composite tape laying machine 10 includes adjustments to insure that the cutter 34 does not cut the backing 16 (see FIG. 8) of the tape assembly 14 when the composite tape 15 is cut.

Accordingly, the composite tape 15 is cut into severed portions in accordance with the computer program. Between each pair of severed portions of the composite tape 15 that are to be applied to a mold 54 (see FIG. 1B) or the like to form a product made of a plurality of stacked portions of the composite tape 15 (see FIG. 8), there is a non-selected severed portion of the composite tape 15. Prior to applying each of the selected severed portions of the composite tape 15 to the mold 54 (see FIG. 1B), each of the non-selected severed portions of the composite tape 15 (see FIG. 8) is removed from the backing 16. This is accomplished after severing and prior to the tape assembly 14 entering a lower tape guide chute assembly 55 (see FIG. 1B).

The removal of each non-selected severed portion of the composite tape 15 (see FIG. 8) from the backing 16 is accomplished by selectively moving a tape 56 (see FIG. 1A), which is a material having a greater adherency to the composite tape 15 (see FIG. 8) than the backing 16, into engagement with the composite tape 15. One suitable example of the removal tape 56 (see FIG. 1A) is sold by Ideal Tapes, Lowell, Mass. as No. 702 polyester film.

Figure 3:
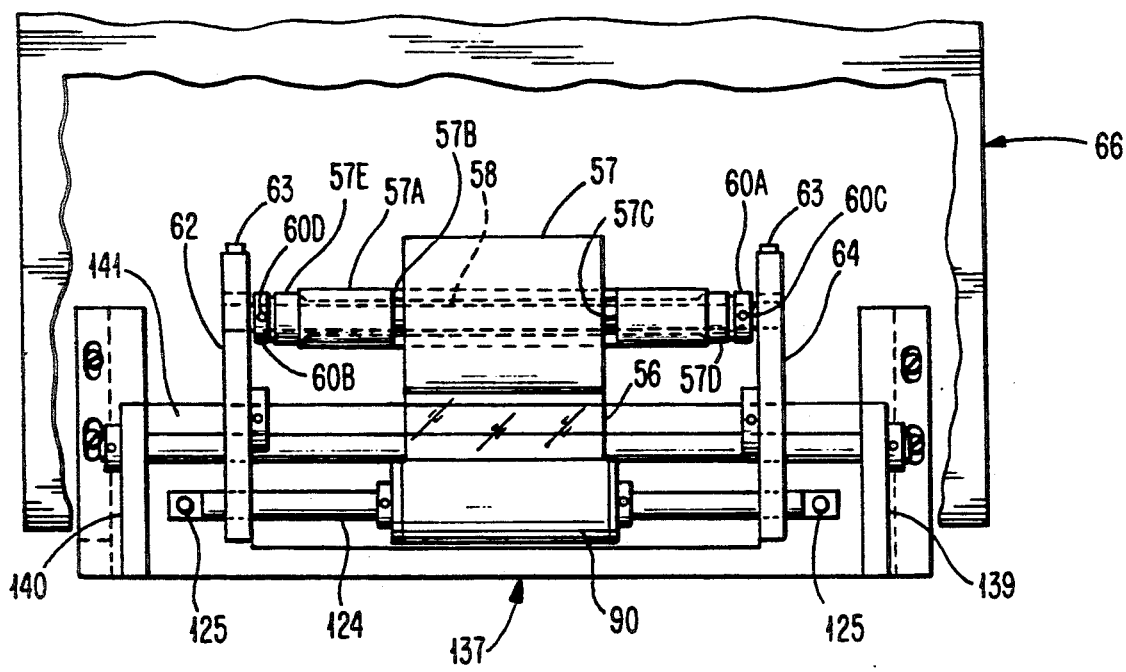
FIG. 3 is a fragmentary elevational view of a portion of the tape removal arrangement of the present invention including a supply reel for a removal tape to remove each severed portion of a composite tape that is not selected for use and a contact roller for moving the removal tape into engagement with each non-selected severed portion of the composite tape and taken along line 3—3 of FIG. 1A.
Figure 11:
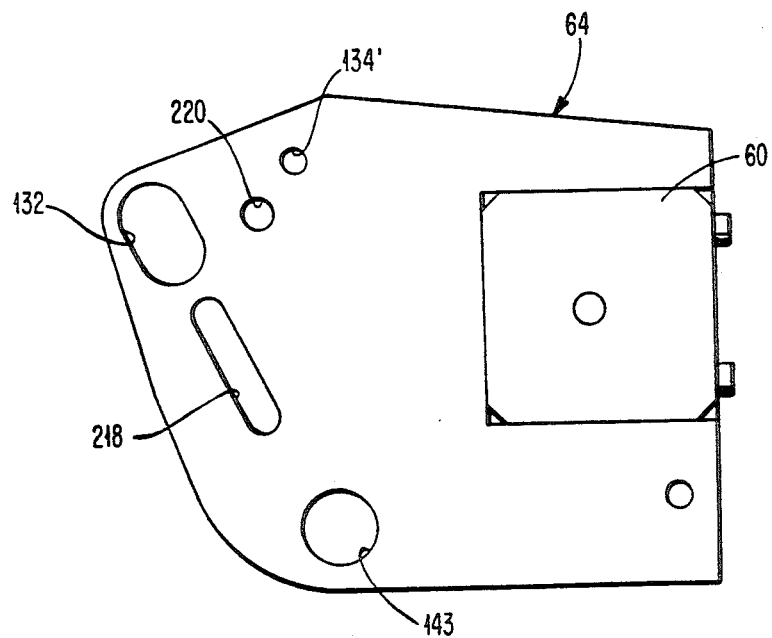
FIG. 11 is a side elevational view of a side swing bracket of a mounting arrangement for the removal tape.

The removal tape 56 is supported on a supply reel 57, which is disposed on a mandrel 57A (see FIG. 3) and retained in position thereon by a pair of retaining rings 57B on opposite ends of the supply reel 57 being disposed in annular grooves 57C in the outer surface of the mandrel 57A. The mandrel 57A is supported on a screw 57D extending therethrough and having a nut 57E attached thereto at the opposite end of the mandrel 57A. A supply reel shaft 58 extends through the screw 57D and the nut 57E and has its ends supported in slide blocks 59 (see FIG. 4) and 60 (see FIG. 11).

A lock collar 60A (see FIG. 3) engages the end of the screw 57D, and a lock collar 60B engages the nut 57E. The lock collars 60A and 60B are secured to the supply reel shaft 58 by set screws 60C and 60D, respectively, so that there can be no longitudinal movement of the mandrel 57A or the supply reel 57. Accordingly, the supply reel 57 is rotatably mounted on the supply reel shaft 58.

Figure 4:
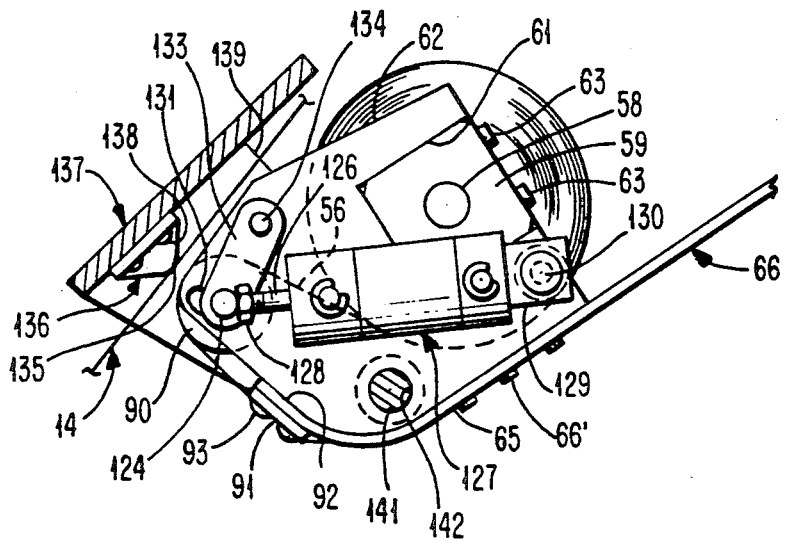
FIG. 4 is a fragmentary side elevational view, partly in section, showing the contact roller and the supply reel of FIG. 3 and an arrangement for moving the removal tape into engagement with the composite tape.

As shown in FIG. 4, the slide block 59 is supported within a recess 61 in a side swing bracket 62 by screws 63. A side swing bracket 64 (see FIG. 11) has the slide block 60 similarly supported.

Each of the side swing brackets 62 (see FIG. 3) and 64 is attached to a portion 65 (see FIG. 4) of a chute 66 by screws 66'. The chute 66 has its uppermost portion 67 (see FIG. 1A) attached by screws 68 to a pair of swing bolt brackets 69 and 70 (see FIG. 7). The screws 68 (see FIG. 1A) also attach support sides 71 (see FIG. 7) and 72 to the swing bolt brackets 69 and 70, respectively.

The side plate 41 of the composite tape laying machine 10 has one end of an L-shaped upper bracket 73 attached thereto by screws 74. The side plate 44 of the composite tape laying machine 10 has one end of an L-shaped bracket 75 attached thereto by screws 76.

Figure 12:
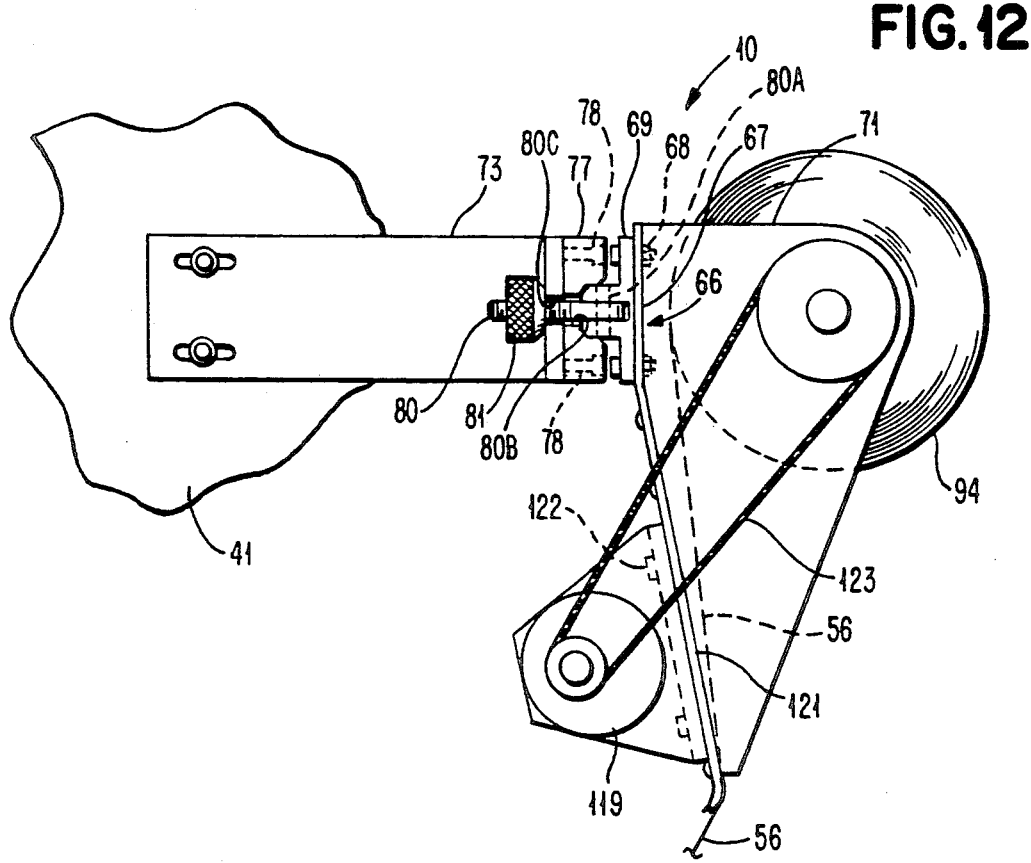
FIG. 12 is a fragmentary side elevational view, partly in section, of an arrangement for supporting the upper end of a guide chute for the removal tape and a take-up reel for the removal tape.

The L-shaped bracket 73 has a stop block 77 attached to its other end by screws 78 (see FIG. 12). A stop block 79 (see FIG. 7) is similarly secured to the L-shaped bracket 75.

A swing bolt 80, which is pivotally supported by a pin 80A (see FIG. 12) on the swing bolt bracket 69, is received within aligned slots 80B and 80C in the stop block 77 and the L-shaped bracket 73, respectively, so that a thumb nut 81 may cooperate with the swing bolt 80 to releasably attach the swing bolt bracket 69 to the L-shaped bracket 73. Likewise, a swing bolt 82 (see FIG. 7), which is pivotally mounted on the swing bolt bracket 70, extends through aligned slots (not shown) in the stop block 79 and the L-shaped bracket 75 to receive a thumb nut 83 for releasably connecting the swing bolt bracket 70 to the L-shaped bracket 75.

Accordingly, when the thumb nuts 81 and 83 are released, the swing bolts 80 and 82 may be pivoted away from each other. This disconnects the chute 66 from the side plates 41 and 44 of the composite tape laying machine 10. Thus, the chute 66 is releasably connected to the side plates 41 and 44 of the composite tape laying machine 10. Therefore, when the chute 66 is attached to the side plates 41 and 44 of the composite tape laying machine 10, the side swing brackets 62 (see FIG. 3) and 64 are retained in the position of FIGS. 4 and 5.

The removal tape 56 (see FIG. 1A) extends from the supply reel 57 around a portion of a contact roller 90 (see FIG. 4) and over the outer surface of a lower support 91 having its sides attached to a portion 92 of the chute 66 by screws 93. The screws 93 also secure each of the side swing brackets 62 and 64 (see FIG. 3) to the portion 92 (see FIG. 4) of the chute 66. The removal tape 56 then extends along the chute 66 to a take-up reel 94 (see FIG. 1A).

A portion 95 of the chute 66 has an upper support 96 attached thereto by screws 97. The take-up reel 94 is mounted on a cylindrical mandrel 98 (see FIG. 7), which is rotatably supported by the support sides 71 and 72.

Figure 29:
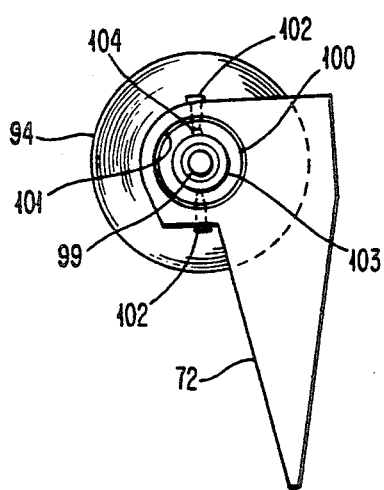
FIG. 29 is a side elevational view of a portion of the take-up reel arrangement of FIG. 7.

The mandrel 98 is fixed by screws (not shown) to a shaft 99 having one end extending through a low precision bearing 99' within a bearing swivel housing 100, which is swivelly mounted in an opening 101 in the support side 72 by a pair of diametrically disposed dog point screws 102 (see FIG. 29). The bearing 99' (see FIG. 7) has its outer race riding in the bearing swivel housing 100 and its inner race riding on the shaft 99 with the inner race having a hub 102' integral therewith. The end of the shaft 99 extends beyond the support side 72 and has a lock collar 103 retained thereon by a set screw 104.

A spring 105 surrounds the shaft 99 between an end of the hub 102' of the bearing 99' and a stop 106. The stop 106, which is engaging with one end of the mandrel 98, is retained in position on the shaft 99 by a set screw 107.

The opposite end of the mandrel 98 has a nut 108 acting thereagainst and retained in position against the mandrel 98 by a screw 109, which is threaded to the interior of the nut 108. A set screw 110 holds the screw 109 in its fixed position on the shaft 99.

Figure 28:
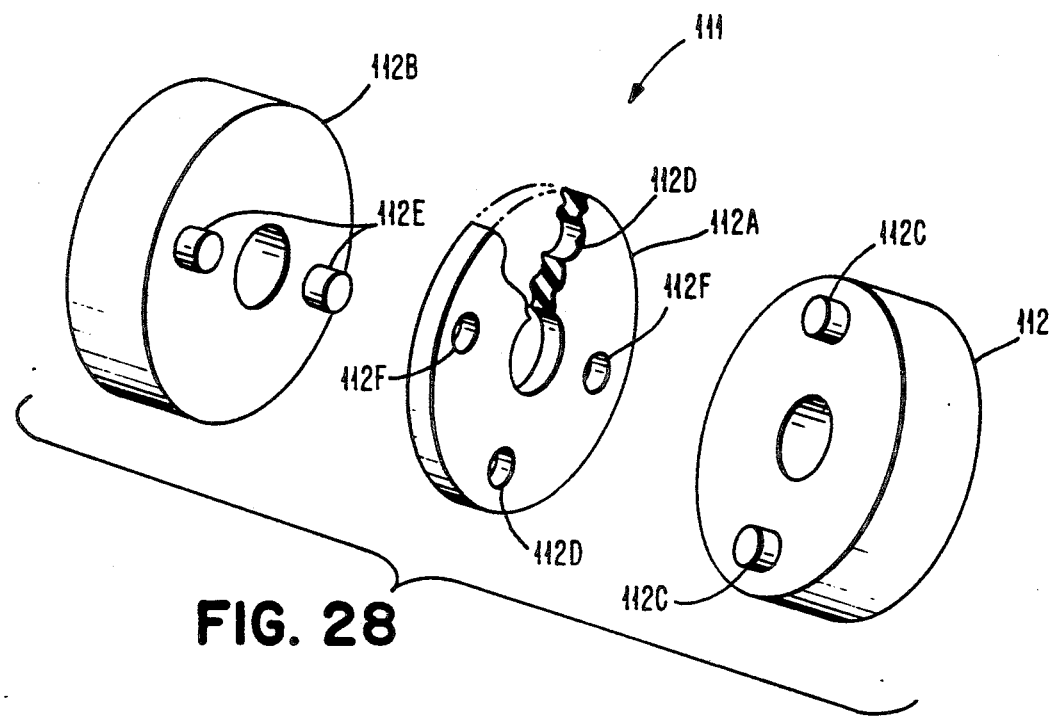
FIG. 28 is an exploded perspective view of a coupling used with the take-up reel support arrangement of FIG. 7.

The shaft 99 extends into a coupling 111. The coupling 111 includes a driving coupling member 112 (see FIG. 28), a rubber disc 112A, and a driven coupling member 112B.

The driving coupling member 112 has two diametrically disposed face pins 112C disposed in two diametrically disposed holes 112D in the rubber disc 112A with a relatively tight fit therebetween. The driven coupling member 112B has two diametrically disposed face pins 112E disposed in two diametrically disposed holes 112B in the rubber disc 112A with a relatively loose fit therebetween.

The shaft 99 (see FIG. 7) is secured to the driven coupling member 112B by a set screw 113. The driving coupling member 112 has a second shaft 114 connected thereto by a set screw 115.

The second shaft 114 extends through a low precision bearing 116, which is the same as the bearing 99' and is mounted in an opening 116A in the side 71. The bearing 116 has its hub 116B secured to the second shaft 114 by a set screw 116C. The second shaft 114 has a drive sprocket 117 fixed thereto.

Accordingly, whenever it is desired to remove the take-up reel 94 from the mandrel 98, the mandrel 98 is pushed towards the support side 72 to overcome the force of the spring 105. This allows the mandrel 98 to be moved towards the support side 72 and to disengage the driven coupling member 112B from the rubber disc 112A. By then swiveling the bearing swivel housing 100 about the screws 102, the mandrel 98 is pivoted counterclockwise sufficiently to enable the take-up reel 94 to be removed from the mandrel 98. To remove the take-up reel 94 from the mandrel 98, one of a pair of retaining rings 118 is removed from one of a pair of annular grooves 118' in the outer surface of the mandrel 98.

By forming the holes 112F (see FIG. 28) in the rubber disc 112A larger than the holes 112D in the rubber disc 112A, the rubber disc 112A will tend to stay with the driving coupling member 112 when the driven coupling member 112B is disengaged from the rubber disc 112A. It should be understood that any suitable flexible and separable coupling may be employed. The flexibility is to accommodate any misalignment of the shafts 99 (see FIG. 7) and 114.

Because the mandrel 98 is fixed to the shaft 99, which is coupled to the second shaft 114, rotation of the drive sprocket 117 drives the mandrel 98. The drive sprocket 117 is driven from an air motor 119 (see FIG. 1A), which is supported by a mounting bracket 120.

The mounting bracket 120 is attached to a portion 121 of the chute 66 by screws 122. The motor 119 is connected to the mandrel 98 (see FIG. 7) through a chain 123 (see FIG. 1A) to rotate the mandrel 98 (see FIG. 7) and the take-up reel 94 (see FIG. 1A).

Thus, when the motor 119 is energized, the removal tape 56 is pulled from the supply reel 57 onto the take-up reel 54. This occurs only when the contact roller 90 (see FIG. 5) is selectively moved into engagement with the composite tape 15 (see FIG. 8) of the tape assembly 14 to remove each of the non-selected severed portions of the composite tape 15 from the backing 16.

The contact roller 90 (see FIG. 4) is rotatably supported on a shaft 124. Each end of the shaft 124 has a threaded passage 125 (see FIG. 13) extending therethrough and into which a threaded end of a piston rod 126 (see FIG. 4) of one of a pair of air cylinders 127 is threaded. Each of the piston rods 126 is held connected to the shaft 124 by a nut 128.

Each of the air cylinders 127 has a tang 129 receiving a shaft 130. The shaft 130 is fixed to each of the side swing brackets 62 and 64 (see FIG. 3).

The shaft 124 (see FIG. 4), which rotatably supports the contact roller 90, extends through a slot 131 in the side swing bracket 62 and a slot 132 (see FIG. 11) in the side swing bracket 64. The slot 131 (see FIG. 4) in the side swing bracket 62 and the slot 132 (see FIG. 11) in the side swing bracket 64 enable the contact roller 90 (see FIG. 4) to be moved between the positions of FIGS. 4 and 5 by extension and retraction of the piston rods 126 of the air cylinders 127.

The shaft 124 also is supported in a pair of pivot arms 133. One of the pivot arms 133 is pivotally mounted on the side swing bracket 62 by a pivot pin 134. The other of the pivot arms 133 is similarly pivotally mounted on the side swing bracket 64 (see FIG. 11) by another of the pivot pins 134 (see FIG. 4) being disposed in an opening 134' (see FIG. 11) in the side swing bracket 64.

Figure 5:
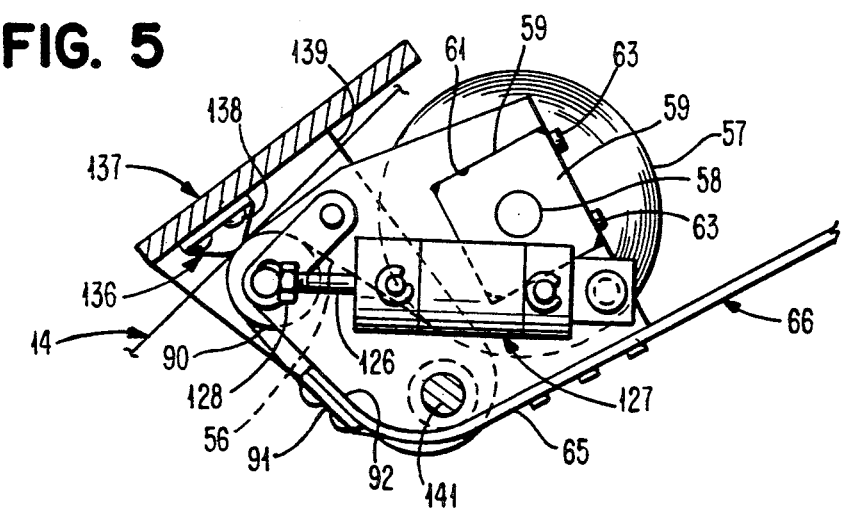
FIG. 5 is a fragmentary side elevational view, partly in section, similar to FIG. 4 but showing the removal tape moved into engagement with the composite tape.

When the piston rod 126 (see FIG. 4) of each of the air cylinders 127 is extended, the contact roller 90 is moved to its position of FIG. 5 with the removal tape 56 engaging one of the non-selected severed portions of the composite tape 15 (see FIG. 8) of the tape assembly 14. This force exerted by the contact roller 90 (see FIG. 5) urges the removal tape 56 against the composite tape 15 (see FIG. 8) at the location of a curved portion 135 (see FIG. 4) of a strike plate 136 having the backing 16 (see FIG. 8) in engagement therewith. The curved portion 135 (see FIG. 4) of the strike plate 136 is tangent to the path of the tape assemble 14.

Figure 6:
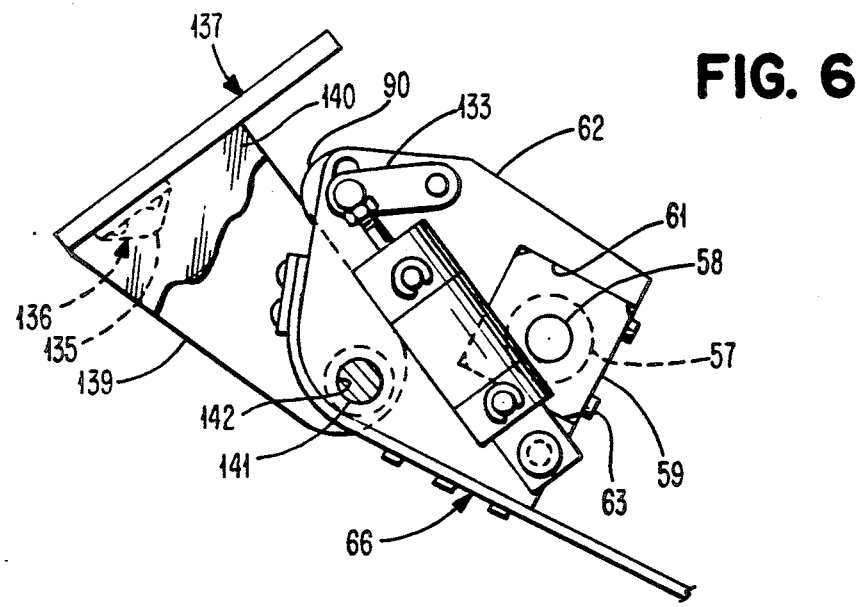
FIG. 6 is a fragmentary side elevational view, partly in section, similar to FIGS. 4 and 5 but showing the tape removal arrangement in a position in which a new reel of the removal tape for removing the non-selected severed portions may be added.

The strike plate 136 is retained on a fixed base plate 137 by screws 138. The base plate 137 has a pair of substantially parallel ears 139 and 140 (see FIG. 6) extending therefrom. The ears 139 and 140 are disposed on opposite sides of the chute 66 and support a shaft 141, which extends through a hole 142 in the side swing bracket 62 and a hole 143 (see FIG. 11) in the side swing bracket 64. This enables the chute 66 (see FIG. 4) and the side swing brackets 62 and 64 (see FIG. 3) to move to the position of FIG. 6 after the chute 66 is disconnected from the swing bolt brackets 69 (see FIG. 7) and 70 when the supply reel 57 (see FIG. 6) of the tape 56 is to be replaced.

The supply reel 57 is replaced by disconnecting the side block 59 from the side swing bracket 62 and the side block 60 (see FIG. 11) from the side swing bracket 64. The side block 59 (see FIG. 6) is then withdrawn from the recess 61 in the side swing bracket 62 and the side block 60 (see FIG. 11) is similarly withdrawn from the side swing bracket 64. Another of the supply reels 57 (see FIG. 4) is then mounted on the side swing brackets 62 and 64 (see FIG. 11).

Accordingly, whenever the air cylinders 127 (see FIG. 4) have pressurized air supplied thereto to extend the piston rods 126, the contact rollter 90 moves the removal tape 56 into engagement with one of the non-selected severed portions of the composite tape 15 (see FIG. 8) to remove it from the backing 16 of the tape assembly 14. The supply of the pressurized air to the air cylinders 127 (see FIG. 4) is controlled by a computer program so that the leading edge of the non-selected severed portion is engaged by the removal tape 56.

The computer program also controls when the removal tape 56 ceases to engage with each non-selected severed portion of the composite tape 15 (see FIG. 8) of the tape assembly 14. For a non-selected severed portion of the composite tape 15 having a varying width, this occurs when the maximum width of the non-selected severed portion of the composite tape 15 reaches the curved portion 135 (see FIG. 4) of the strike plate 136. For a non-selected severed portion of the composite tape 15 (see FIG. 8) having a constant width, the contact roller 90 (see FIG. 4) is preferably withdrawn when fifty percent of the length of the non-selected severed portion of the composite tape 15 (see FIG. 8) has passed the curved portion 135 (see FIG. 4) of the strike plate 136.

Figure 1B:
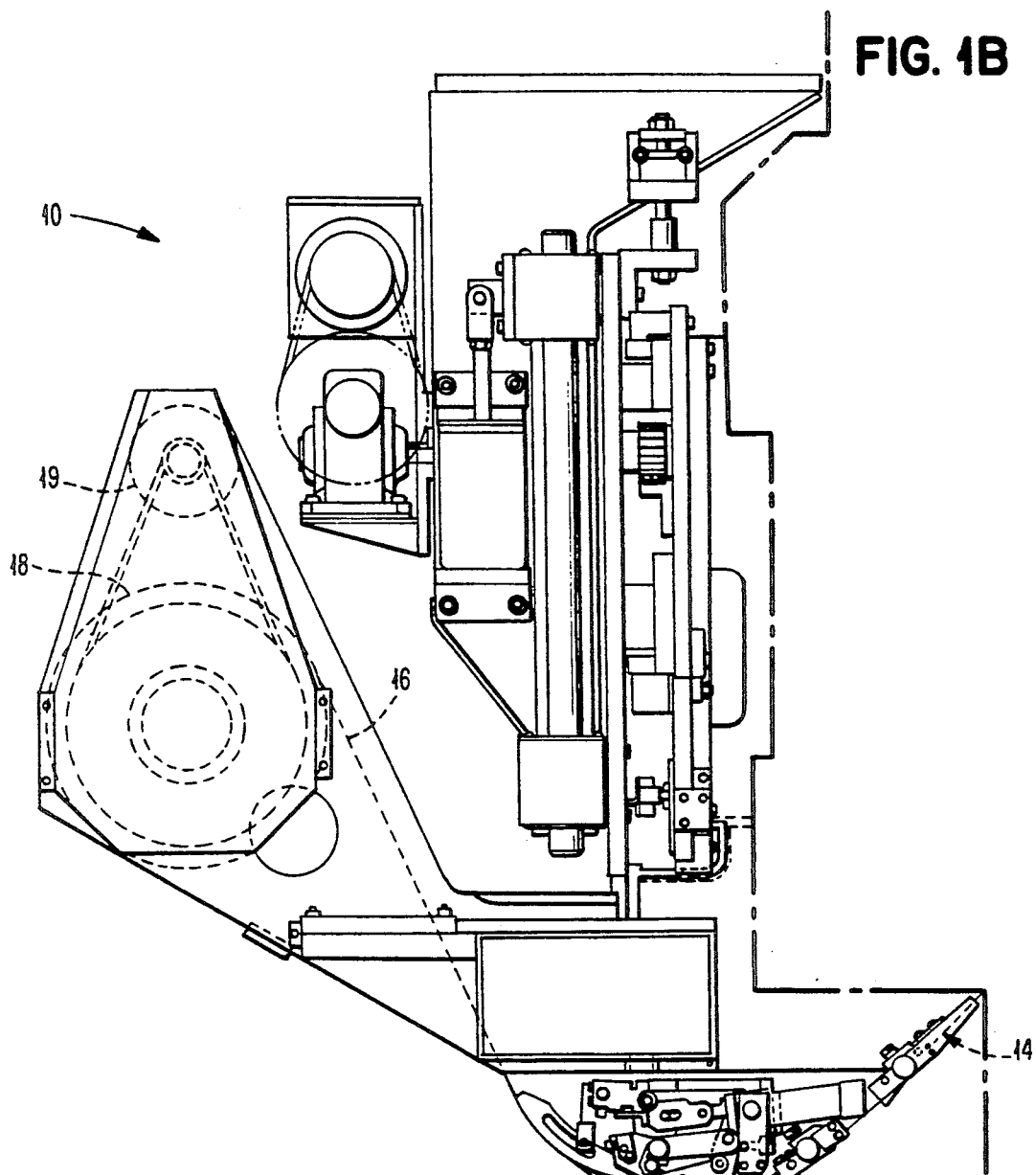
FIG. 1B is a side elevational view of the remainder of the portion of the composite tape laying machine of FIG. 1A and with some parts omitted for clarity purposes.
Figure 14:
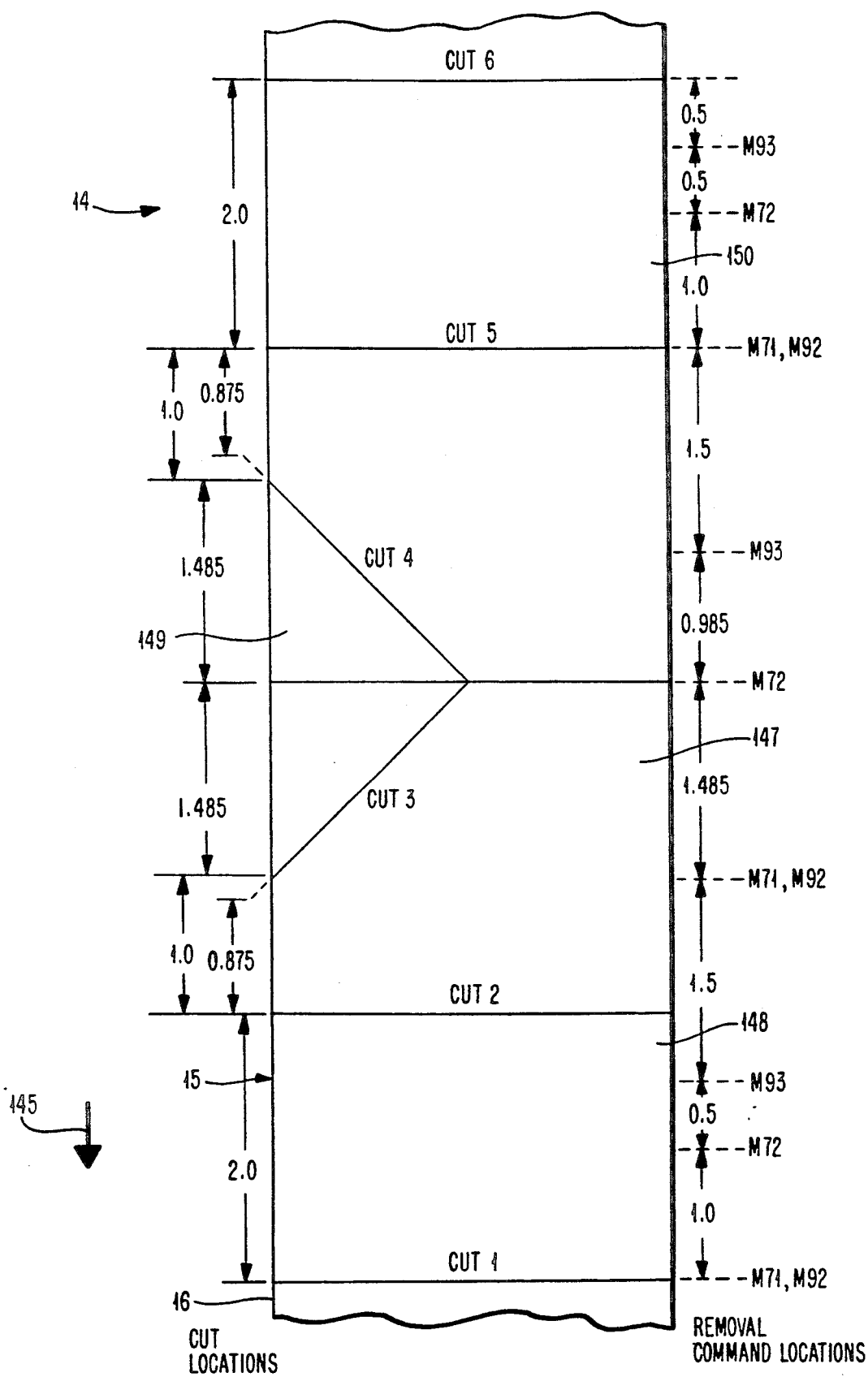
FIG. 14 is a fragmentary schematic plan view of a portion of a composite tape having selected and non-selected portions and showing where cuts are to be made in the composite tape, where each non-selected severed portion is to be engaged by the removal tape, and where the removal tape is to be disengaged from each non-selected severed portion.

Referring to FIG. 14, there is shown a portion of the composite tape 15 moving in the direction indicated by an arrow 145 towards a laydown shoe 146 (see FIG. 1B), which applies selected severed portions of the composite tape 15 (see FIG. 14) to the mold 54 (see FIG. 1B). As shown in FIG. 14, the composite tape 15 has one severed portion 147, which is to be applied to the mold 54 (see FIG. 1B) with three other severed portions 148 (see FIG. 14), 149, and 150 not being selected for application to the mold 54 (see FIG. 1B) by the shoe 146.

With CUT 1 (see FIG. 14) of the composite tape 15 assumed to be under the shoe 146 (see FIG. 1B), a program for completing CUTS 2-6 (see FIG. 14) to produce the selected severed portion 147 is as follows:

:G01X0.000Y0.000Z5.000C0.000A0.000D0.000F1200.E0.000V1.515Q0.000$
M76M78$
F1800.U-24.615$
F500.U2.0$
M57$
F120.V4.735$
M56$
F500.U0.875$
F5000.D135.V1.515$
M57$
F120.U1.61V3.125$
M56$
F9000.D45.$
M57$
F120.U1.61V1.515$
M56$
U0.875$
F9000.D0.$
M57$
F120.V4.735$
M56$
F500.U0.245$
M71$
M92$
U1.0$
M72$
U0.5$
M93$
U0.255V1.515$
M57$
F120.V4.735$
M56$
F500.U1.245$
M71$
M92$
U1.485$
M72$
U0.985$
M93$
U1.5$
M71$
M92$
U1.0$
M72$
U0.5$
M93$
U0.5$
U10.43$
X0.0Y1.5$
F300.Z1.0$
F100.Z0.0$
F500.X4.97U4.97$
F500.Z2.0$
U2.0$
M02$

Two dimensions are critical to this program. One is the distance between the center of C-axis rotation under the laydown shoe 146 (see FIG. 1B) and a cutter 151 (see FIG. 1A) of the second cutter assembly 22. This distance is 25.615" in the U axis and is used to determine where the cuts must be produced. The U-axis movement of the tape assembly 14 is between the supply reel 11 and the back-up reel 18 (see FIG. 1B) and can be in either direction.

The second critical dimension is the distance between the contact roller 90 (see FIG. 4) and the cutter 151 (see FIG. 1A) of the second cutter assembly 22. This distance is 7.215".

The part specific computer program is used with an ACRAMATIC 975C CNC CONTROL sold by Cincinnati Milacron, Inc., the assignee of this application. The program includes a plurality of M-Codes for controlling various mechanisms. Each of these M-Codes is a miscellaneous command.

With CUT 1 (see FIG. 14) assumed to be under the shoe 146 (see FIG. 1B) at the start of the program to produce the selected severed portion 147 (see FIG. 14) and apply it to the mold 54 (see FIG. 1B), only CUT 2 (see FIG. 14) through CUT 6 are produced by the program. Each line of the program is listed along with a brief description concerning what action the line of code in the program performs with $ indicating end of block character for each line.

:G01X0.000Y0.000Z5.000C0.000A0.000D0.000F1200.E0.000V1.515Q0.000$

Because this block begins with a colon character, it is referred to as a colon block. This part specific computer program can only be begun in the ACRAMATIC 975C CNC CONTROL with a colon block. The colon block must contain a programmed move for each of the programmable axes of X, Y, Z, A, C, E, Q, and V. Only the U axis is in an incremental mode in this program.

Each of the X, Y, Z, and A axes is described in the aforesaid Grone et al patent, U.S. Pat. No. 4,627,886. The C axis has previously been described as the rotation of the laydown show 146 (see FIG. 1B). The D axis is the rotational axis of the cutter 151.(see FIG. 1A) of the second cutter assembly 22, the E axis is the rotational axis of the cutter 34 of the first cutter assembly 21, the Q axis is the transverse axis along with the first cutter assembly 21 is moved, and the V axis is the transverse axis along which the second cutter assembly 22 is moved. With the composite tape 15 (see FIG. 14) having a width of 2.97", the left (as viewed in FIG. 14) edge of the composite tape 15 is at posiation 1.640" in the V axis and the right edge of the composite tape 15 is at position 4.610" in the V axis.

G01 places the control in a programmed feed rate mode with the F1200.0 command setting the programmed feed rate. The composite tape laying machine 10 (see FIG. 1B) is positioned at a reference point above the mold 54 by X=0.000, Y=0.000, Z=5.000, A=0.000, and C=0.000. The axis of the cutter 151 (see FIG. 1A) of the second cutter assembly 22 is prepositioned by D=0.000 and V=1.515. (This is 0.125" prior to the left (as viewed in FIG. 14) edge of the composite tape 15.). The cutter 34 (see FIG. 1A) of the first cutter assembly 21 has its axis prepositioned by E=0.000 and Q=0.

M76M78$

The M76 command turns on a motor 152, which rotates the cutter 151 of the second cutter assembly 22. M78 is a command for turning on the motor 33 for the cutter 34 of the first cutter assembly 21.

F1800.U-24.615$

This is a programmed move in the U axis in which the tape assembly 14 is rewound on the supply reel 11 to reposition the CUT 1 (see FIG. 14) of the composite tape 15 from the bottom of the laydown shoe 146 (see FIG. 1B) to the cutter 151 (see FIG. 1A) of the second cutter assembly 22 with this being a distance of 24.615". As previously mentioned, this is one of the two critical dimensions. The feed rate of the tape assembly 14 is set by the F1800.0 command. This movement of the composite tape 15 (see FIG. 14) assumes that there is a 0° cut under the shoe 146 (see FIG. 1B) at the start of the part specific computer program. Thus, the CUT 1 is shown in FIG. 14 as a 0° cut, which is perpendicular to the direction of travel of the composite tape 15.

F500.U2.0$

This is a programmed U axis move of 2.0" to advance the tape assembly 14 (see FIG. 1B) towards the shoe 146. This disposes the composite tape 15 (see FIG. 14) so that CUT 2 can be made by the cutter 151 (see FIG. 1A) of the second cutter assembly 22.

M57$

Insert the cutter 151 (see FIG. 1A) of the second cutter assembly 22.

F120.V4.735$

This moves the cutter 151 (see FIG. 1A) of the second cutter assembly 22 across the composite tape 15 (see FIG. 14) from a V-axis position of 1.515" to 4.735" to produce CUT 2.

M56$

This retracts the cutter 151 (see FIG. 1A) of the second cutter assembly 22.

F500. U0.875$

This advances the composite tape 15 (see FIG. 14) in the direction of the arrow 145 to position the composite tape 15 for the beginning of CUT 3. The advance is 0.875".

F5000.D135.V1.515$

This causes rotation of the cutter 151 (see FIG. 1A) of the second cutter assembly 22 from 0° to 135° and repositions the second cutter assembly 22 along the V axis from position 4.735" to position 1.515".

M57$

This inserts the cutter 151 (see FIG. 1A) of the second cutter assembly 22 in preparation for making CUT 3 (see FIG. 14).

F120.U61V3.125$

This produces CUT 3 by moving the second cutter assembly 22 (see FIG. 1A) from the V-axis position 1.515" to 3.125" while moving the composite tape 15 simultaneously 1.61" in the direction of the arrow 145. This distance of 1.61" is shown on the left side of the composite tape 15 in FIG. 14 from 0.875" past CUT 2 to 2.485" past CUT 2.

M56$

This retracts the cutter 151 (see FIG. 1A) of the second cutter assembly 22 after CUT 3 (see FIG. 14) is completed.

F9000.D45.$

This rotates the cutter 151 (see FIG. 1A) of the second cutter assembly 22 about the D axis from 135° to 45° to position the cutter 151 for CUT 4 (see FIG. 14).

M57$

This inserts the cutter 151 (see FIG. 1A) of the second cutter assembly 22 in anticipation of making CUT 4 (see FIG. 14).

F120.U1.61V1.515$

This moves the second cutter assembly 22 (see FIG. 1A) to the 1.515" position in the V axis and simultaneously moves the composite tape 15 (see FIG. 14) in the direction of the arrow 145 for 1.61".

M56$

This retracts the cutter 151 (see FIG. 1A) of the second cutter assembly 22 after CUT 4 (see FIG. 14) is completed.

U0.875$

This advances the composite tape 15 in the direction of the arrow 145 for 0.875" to position the composite tape 15 for making CUT 5.

F9000.D0.$

This rotates the cutter 151 (see FIG. 1A) of the second cutter assembly 22 about the D axis from 45° to 0° to position the cutter 151 (see FIG. 1A) of the second cutter assembly 22 for making CUT 5 (see FIG. 14).

M57$

This inserts the cutter 151 (see FIG. 1A) of the second cutter assembly 22 to prepare for producing CUT 5.

F120.V4.735$

This moves the second cutter assembly 22 (see FIG. 1A) to the 4.735" position in the V axis to produce CUT 5 (see FIG. 14) of the composite tape 15.

M56$

This retracts the cutter 151 (see FIG. 1A) of the second cutter assembly 22 at the completion of CUT 5 (see FIG. 14).

F500.U0.245$

This moves the composite tape 15 along the U axis for 0.245" to the position at which the contact roller 90 (see FIG. 4) can be inserted to begin removal of the non-selected severed portion 148 (see FIG. 14) of the composite tape 15.

M71$

This inserts the contact roller 90 (see FIG. 4) so that the removal tape 56 contacts the composite tape 15 (see FIG. 14).

M92$

This turns on the motor 119 (see FIG. 1A) to rotate the take-up reel 94 to advance the removal tape 56 to begin to peel off the non-selected severed portion 148 (see FIG. 14) of the composite tape 15 from the backing 16 of the tape assembly 14.

U1.0$

This advances the composite tape 15 in the direction of the arrow 145 for 1" to adhere the beginning of the non-selected severed portion 148 to the removal tape 56 (see FIG. 4).

M72$

This retracts the contact roller 90 so that the contact roller 90 no longer is holding the removal tape 56 in contact with the composite tape 15 (see FIG. 14).
U0.5$ This advances the composite tape 15 in the direction of the arrow 145 for 0.5" where the non-selected severed portion 148 of the composite tape 15 is released from the backing 16 of the tape assembly 14.
M93$ This turns off the motor 119 (see FIG. 1A) to stop advancement of the removal tape 56.
U0.255V1.515$ This moves the composite tape 15 (see FIG. 14) 0.255" in the direction of the arrow 145 to position the composite tape 15 to have CUT produced. This also repositions the second cutter assembly 22 (see FIG. 1A) to position 1.515" in the V axis for production of CUT 6 (see FIG. 14).
M57$ This inserts the cutter 151 (see FIG. 1A) of the second cutter assembly 22 so that CUT 6 (see FIG. 14) can be produced.
F120.V735$ This moves the cutter 151 (see FIG. 1A) across the composite tape 15 (see FIG. 14) from the V-axis position of 1.515" to 4.735" to produce CUT 6.
M56$ This retracts the cutter 151 (see FIG. 1A) of the second cutter assembly 22 at the end of CUT 6 (see FIG. 14).
F500.U1.245$ This moves the composite tape 15 (see FIG. 14) in the direction of the arrow 145 for 1.245" to position the composite tape 15 where the beginning of the non-selected severed portion 149 can be removed by the removal tape 56 (see FIG. 4).
M71$ This inserts the contact roller 90 so that the removal tape 56 contacts the composite tape 15 (see FIG. 14).
M92$ This turns on the air motor 119 (see FIG. 1A) to begin the process of removing the non-selected severed portion 149 (see FIG. 14) of the composite tape 15.
U1.485$ This moves the composite tape 15 in the direction of the arrow 145 for 1.485" to adhere the non-selected severed portion 149 of the composite tape 15 to the removal tape 56 (see FIG. 4).
M72$ This retracts the contact roller 90.
U0.985$ This moves the composite tape 15 (see FIG. 14) in the direction of the arrow 145 for 0.985". This distance causes the non-selected severed portion 149 (see FIG. 14) to cease to be engaged to the backing 16 of the tape assembly 14.
M93$ This turns off the air motor 119 (see FIG. 1A) to stop movement of the removal tape 56.
U1.5$ This advances the composite tape 15 (see FIG. 14) for 1.5" in the direction of the arrow 145 to dispose the non-selected severed portion 150 of the composite tape 15 for removal from the backing 16 of the tape assembly 14.
M71$ This inserts the contact roller 90 (see FIG. 4) so that the removal tape 56 engages the non-selected severed portion 150 (see FIG. 14) of the composite tape 15.
M92$ This activates the air motor 119 (see FIG. 1A) to begin advancement of the removal tape 56 to start peeling off the non-selected severed portion 150 (see FIG. 14) of the composite tape 15 from the backing 16 of the tape assembly 14.
U1.0$ This advances the composite tape 15 in the direction of the arrow 145 for 1" to adhere the non-selected severed portion 150 of the composite tape 15 to the removal tape 56 (see FIG. 4).
M72$ This retracts the contact roller 90.
U0.5$ This moves the composite tape 15 (see FIG. 14) in the direction of the arrow 145 for 0.5" to cause the non-selected severed portion 150 of the composite tape 15 to become detached from the backing 16 of the tape assembly 14.
M93$ This turns off the air motor 119 (see FIG. 1A) to stop advancement of the removal tape 56.
U10.43$ This advances the tape assembly 14 (see FIG. 14) 10.43" to position the selected severed portion 147 for laying on the mold 54 (see FIG. 1B) by the shoe 146.
X0.0Y1.5$ This moves the composite tape laying head 10 along the X and Y axes above the point where the selected severed portion 147 (see FIG. 14) is to be laid.
F300.Z1.$ This lowers the head 10 (see FIG. 1B) along the Z axis to dispose the shoe 146 1" above the surface of the mold 54.
F100.Z0.$ This lowers the head 10 along the Z axis at a very low feed rate until the shoe 146 engages the surface of the mold 54 to which the selected severed portion 147 (see FIG. 14) of the composite tape 15 is to be applied.
F500.X4.97U4.97$ This rolls out the selected severed portion 147 of the composite tape 15 onto the surface of the mold 54 (see FIG. 1B). The tape assembly 14 (see FIG. 14) is advanced in the direction of the arrow 145 for the distance of 4.97"; this is the length of the selected severed portion 147 of the composite tape 15 from CUT 2 to CUT 5.
F300.Z2.0$ This raises the head 10 (see FIG. 1B) along the Z axis so that the shoe 146 is no longer engaging the selected severed portion 147 (see FIG. 14) of the composite tape 15.
U2.0$ This advances the composite tape 15 for 2" in the direction of the arrow 145 to dispose the next selected severed portion, which is the portion of the composite tape 15 after CUT 6.
M02$ This is the end of the part specific computer program for laying the selected severed portion 147 of the composite tape 15.

Figure 15:
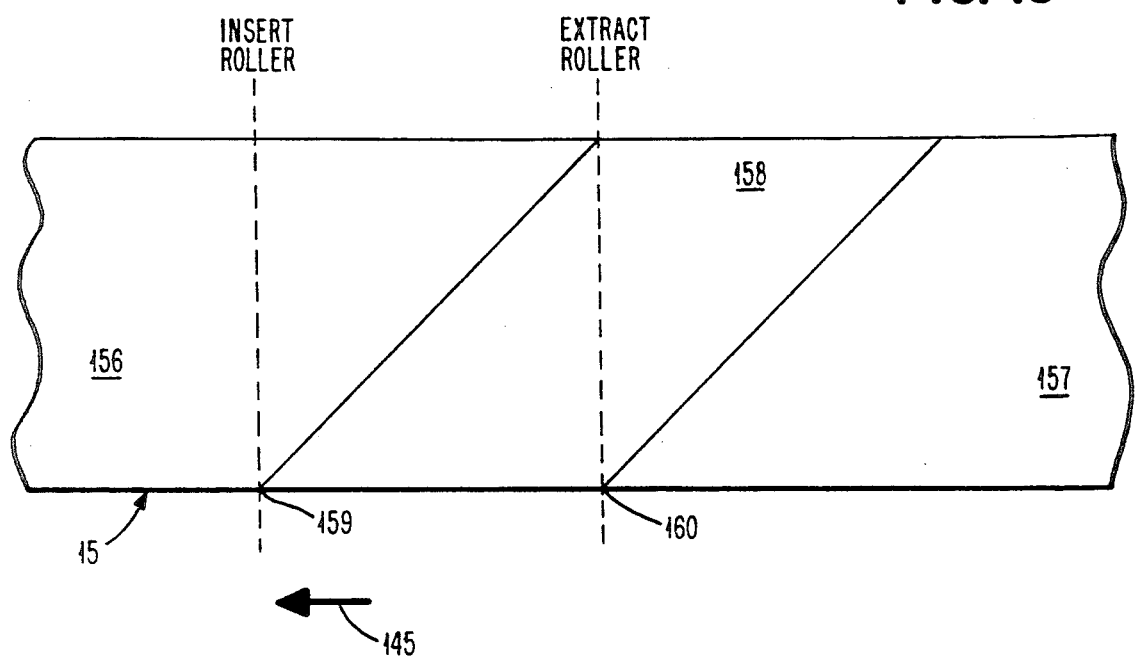
FIG. 15 is a fragmentary schematic plan view of a portion of a composite tape having selected and non-selected severed portions and showing where a non-selected severed portion is to be engaged and disengaged by the removal tape on the contact roller.

In FIG. 15, the composite tape 15 is moving in the direction indicated by the arrow 145. The composite tape 15 has two severed portions 156 and 157, which are to be applied to the mold 54 (see FIG. 1B) as selected severed portions, with a non-selected severed portion 158 (see FIG. 15) between the selected severed portions 156 and 157. The contact roller 90 (see FIG. 4) moves the removal tape 56 into engagement with the non-selected severed portion 158 (see FIG. 15) of the composite tape 15 at a leading edge 159 of the non-selected severed portion 158. The removal tape 56 (see FIG. 4), which passes around the contact roller 90, is removed from engagement with the non-selected severed portion 158 (see FIG. 15) when the maximum width of the non-selected severed portion 158 starts as indicated at a point 160.

Figure 16:
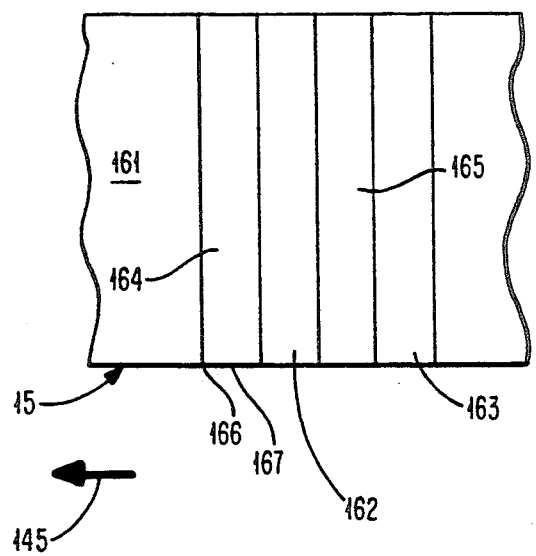
FIG. 16 is a fragmentary schematic plan view of a portion of a composite tape showing where the removal tape engages and disengages each of a plurality of non-selected severed portions of the composite tape.

In FIG. 16, the composite tape 15 is moving in the direction indicated by the arrow 145. The composite tape 15 has severed portions 161, 162, and 163, which are selected to be applied to the mold 54 (see FIG. 1B). A non-selected severed portion 164 (see FIG. 16) is between the selected portions 161 and 162, and a non-selected severed portion 165 is between the selected severed portions 162 and 163.

Each of the non-selected severed portions 164 and 165 has the same width as the composite tape 15. Thus, the non-selected severed portion 164 has the removal tape 56 (see FIG. 4) moved into engagement therewith by the contact roller 90 at its leading edge 166 (see FIG. 16). The removal tape 56 (see FIG. 4), which passes around the contact roller 90, is removed from engagement with the non-selected severed portion 164 at a point 167 (see FIG. 16), which is preferably one-half of the length of the non-selected severed portion 164. The non-selected severed portion 165 has the removal tape 56 (see FIG. 4) moved into engagement therewith by the contact roller 90 and disengaged therefrom in the same manner as discussed for the non-selected severed portion 164 (see FIG. 16).

There could be any number of the non-selected severed portions 164 and 165 spaced the same or different distances from each other to form strips of selected portions of the composite tape 15 of the same or different lengths. For example, the non-selected severed portion 164 could have a length of one-quarter inch with the tape removal point 167 being one-eighth inch from the leading edge 166.

Figure 17:
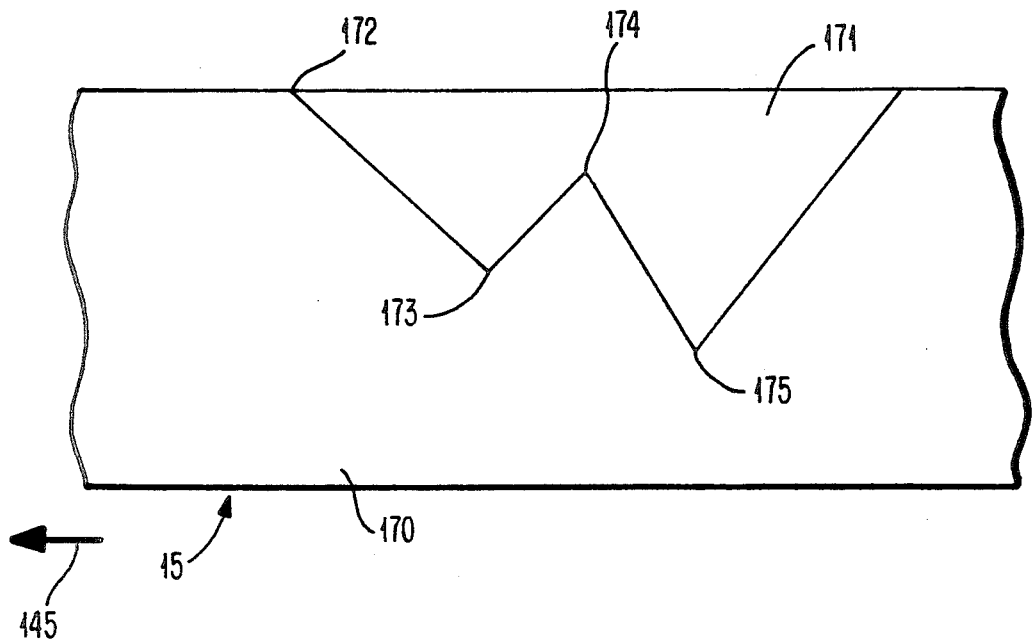
FIG. 17 is a fragmentary schematic plan view of a composite tape showing where a non-selected severed portion is engaged and disengaged by the removal tape.

Referring to FIG. 17, the composite tape 15 moves in the direction indicated by the arrow 145. The composite tape 15 has a selected severed portion 170 with its leading and trailing edges not being shown.

A non-selected severed portion 171 is disposed within the selected portion 170 but does not extend across the entire width of the composite tape 15. The non-selected portion 171 has the removal tape 56 (see FIG. 4) moved into engagement therewith at its leading edge 172 (see FIG. 17) and removed from engagement therewith at a first maximum width 173. When the non-selected severed portion 171 decreases to a minimum width as indicated at a point 174, the removal tape 56 (see FIG. 4), which passes around the contact roller 90, is again moved into engagement with the composite tape 15 (see FIG. 17). When the non-selected severed portion 171 of the composite tape 15 again reaches a maximum width as indicated at 175, the removal tape 56 (see FIG. 4) is disengaged from the composite tape 15 (see FIG. 17).

Figure 18:
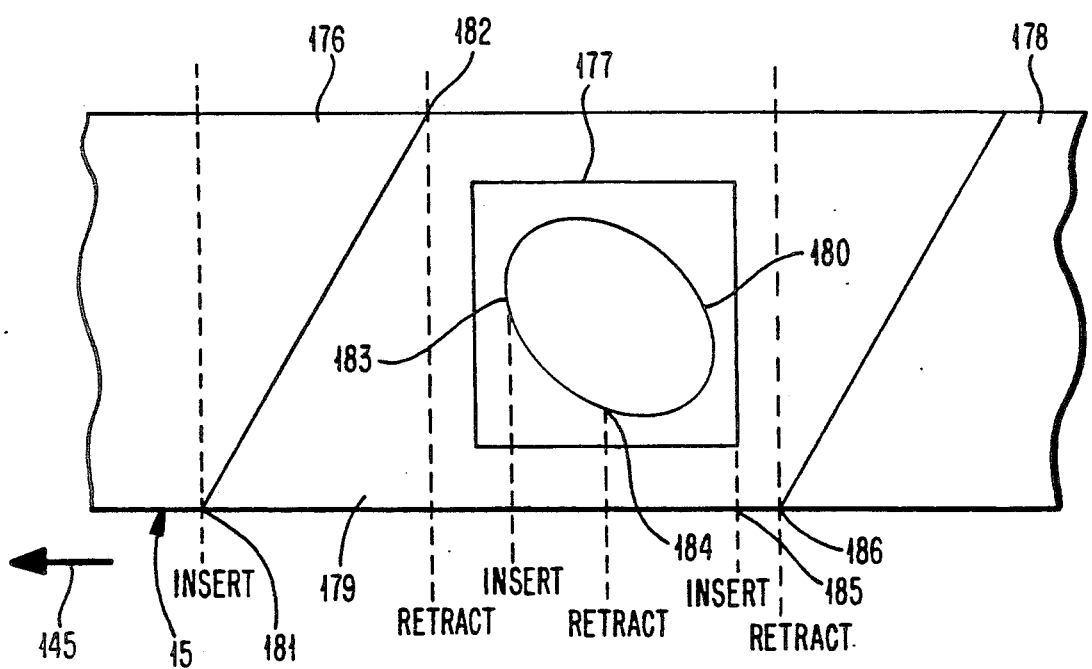
FIG. 18 is a fragmentary schematic plan view of a portion of a composite tape showing where each non-selected severed portion is engaged and disengaged by the removal tape.

Referring to FIG. 18, the composite tape 15 moves in the direction indicated by the arrow 145. The composite tape 15 includes severed portions 176, 177, and 178, which are selected for application to the mold 54 (see FIG. 1B). The composite tape 15 (see FIG. 18) also includes severed portions 179 and 180, which are not selected for application to the mold 54 (see FIG. 1B).

The removal tape 56 (see FIG. 4) is moved into engagement with the non-selected severed portion 179 (see FIG. 18) at its leading edge 181 and disengaged from the non-selected severed portion 179 at its maximum width as indicated at a point 182. The removal tape 56 (see FIG. 4) is moved into engagement with the non-selected severed portion 180 (see FIG. 18), which has a curved periphery, at its leading point 183 and is removed from engagement therewith at its maximum width as indicated at a point 184. The removal tape 56 (see FIG. 4) is again moved into engagement with the non-selected severed portion 179 (see FIG. 18) at a point 185, which is at the trailing edge of the selected severed portion 177. The removal tape 56 (see FIG. 4) is moved out of engagement with the non-selected severed portion 177 (see FIG. 18) at a point 186, which is when the non-selected severed portion 179 begins to decrease from its maximum width and is the leading edge of the selected severed portion 178.

Figure 20:
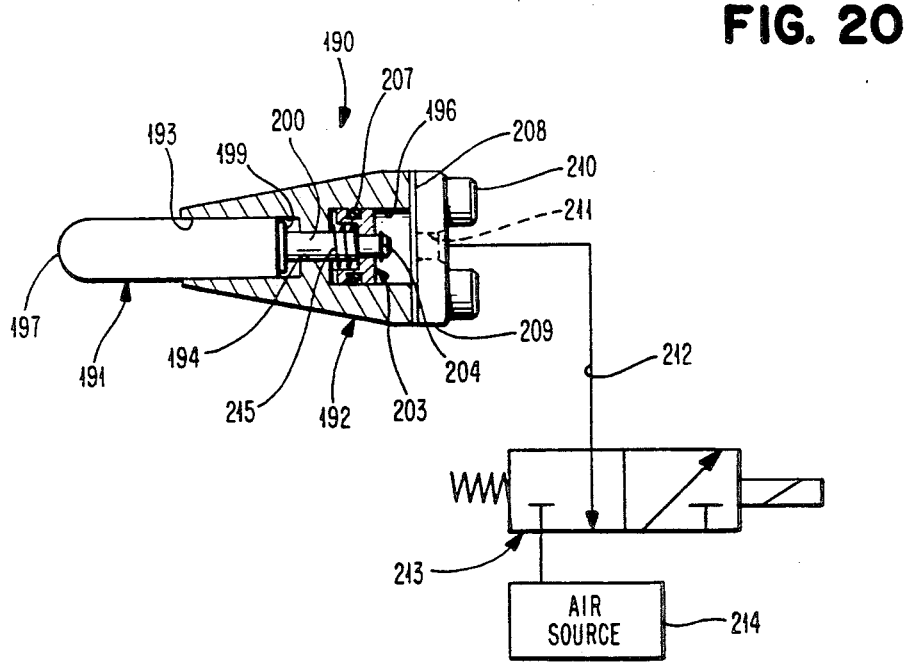
FIG. 20 is a side elevational view, partly in section and partly schematic, of the finger assembly for moving the removal tape into engagement with each non-selected severed portion of the composite tape.

Instead of applying the removal tape 56 (see FIG. 4) across the entire width of the composite tape 15 as shown in FIGS. 14-18, the removal tape 56 (see FIG. 4) could be applied to only the portions of the width of the composite tape 15 (see FIG. 8) having a non-selected severed portion. One arrangement for accomplishing this is to use a finger assembly 190 (see FIG. 20) having eleven fingers 191 for selective activation of each of the fingers 191 into engagement with a portion of the width of the removal tape 56 (see FIG. 19) to engage a portion of the width of the composite tape 15 (see FIG. 8) of the tape assembly 14.

Figure 21:
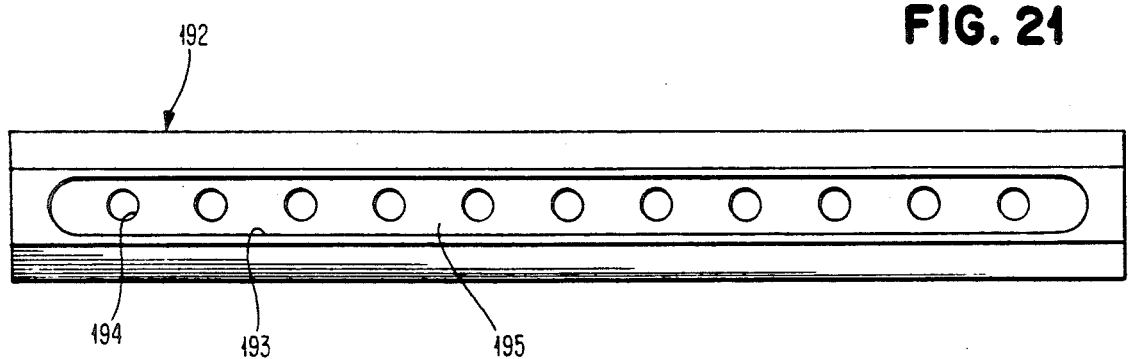
FIG. 21 is a fragmentary front elevational view of a body of the finger assembly of FIG. 20.

The finger assembly 190 (see FIG. 20) includes a body 192 (see FIG. 21) having a recess 193 extending for substantially the length of the body 192. The recess 193 has passages 194 of circular cross section extending from its bottom surface 195 into communication with chambers 196 (see FIG. 20) of circular cross section in the body 192. The number of the passages 194 and the number of the chambers 196 are equal to each other and equal to the number of the fingers 191.

Figure 23:
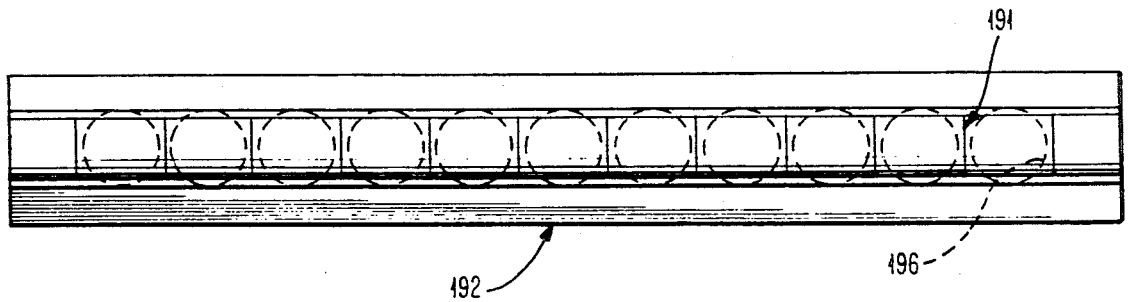
FIG. 23 is a front elevational view of the body of the finger assembly and similar to FIG. 20 but showing the fingers mounted in a recess in the body.
Figure 24:
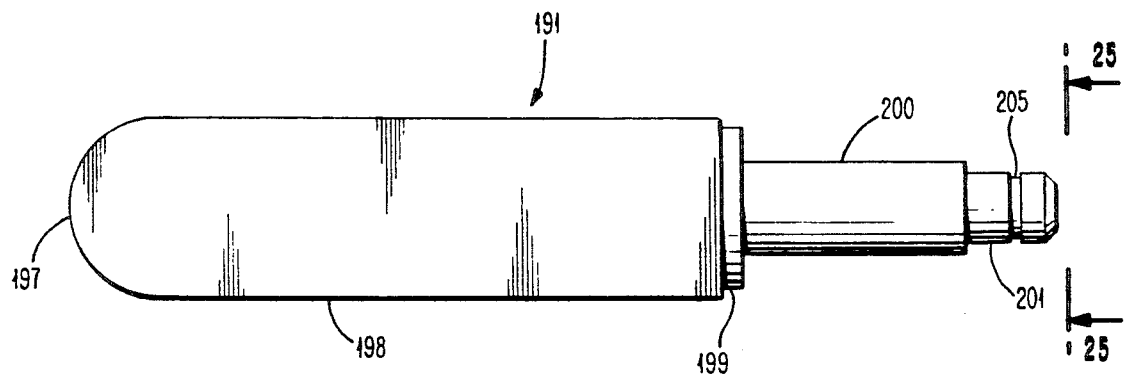
FIG. 24 is a side elevational view of one of the fingers of the finger assembly of FIG. 20.

As shown in FIG. 24, each of the fingers 191 terminates in a curved surface 197. When viewed from its end as shown in FIG. 23, each of the fingers 191 has a rectangular configuration. Thus, the fingers 191 have abutting edges so that when all eleven of the fingers 191 are activated, the fingers 191 engage the entire width of the removal tape 56 (see FIG. 19). This results in the removal tape 56 engaging the entire width of the composite tape 15 (see FIG. 8).

Figure 25:
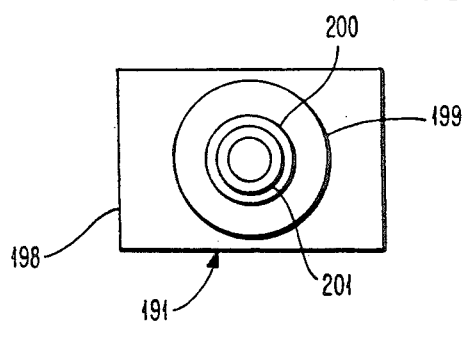
FIG. 25 is a rear elevational view of the finger of FIG. 24 and taken along line 25—25 of FIG. 24.

As shown in FIGS. 24 and 25, each of the fingers 191 includes a main portion 198 of rectangular cross section. The outer portion 198 has the curved surface 197 on its outer end and a reduced portion 199 of circular cross section at its inner end.

Figure 26:
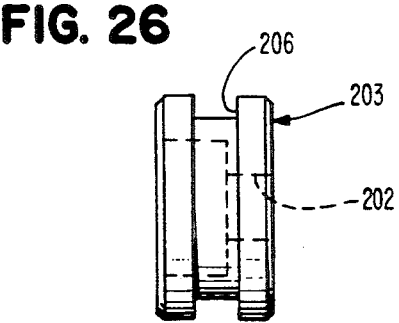
FIG. 26 is a side elevational view of a piston of the finger assembly of FIG. 20.

The finger 191 has an elongated portion 200 of circular cross section extending from the reduced portion 199 through the passage 194 (see FIG. 20) into the chamber 196 in the body 192. The elongated portion 200 (see FIG. 24) of the finger 191 has a retaining portion 201 of circular cross section extending from its inner end through a circular passage 202 (see FIG. 26) in a piston 203, which is slidably disposed within one of the chambers 196 (see FIG. 20) in the body 192.

A retaining ring 204 is disposed within an annular groove 205 (see FIG. 24) in the retaining portion 201 of the finger 191. This connects the piston 203 (see FIG.

20) and the finger 191 to each other. Thus, each of the fingers 191 and the connected piston 203 move together in a linear direction because of the elongated portion 200 of the finger 191 sliding in the passage 194 in the body 192 so as to be guided thereby.

Figure 22:
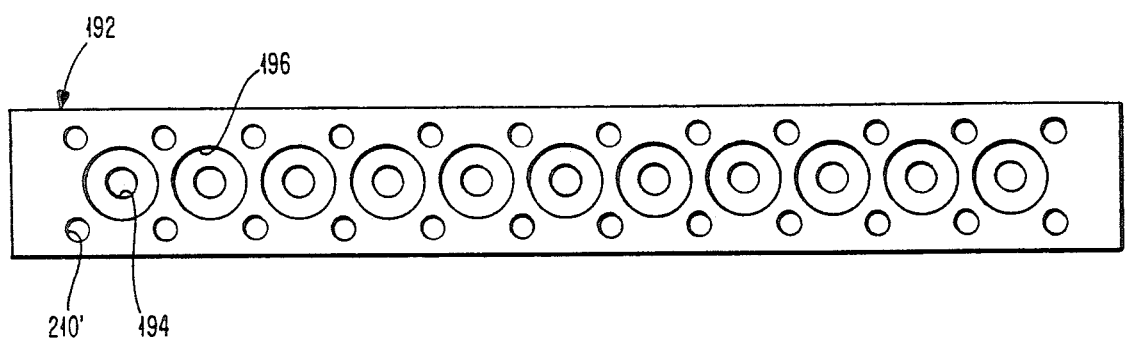
FIG. 22 is a fragmentary rear elevational view of the body of the finger assembly.

The piston 203 (see FIG. 26) has an annular groove 206 formed in its outer surface to receive an O-ring 207 (see FIG. 20), which forms a seal with the wall of the chamber 196 in the body 192. A gasket 208 is disposed at the larger end of the body 192 to form a seal around each of the chambers 196 in the body 192. A cover 209 is held in contact with the gasket 208 and the body 192 by screws 210 extending into threaded holes 210' (see FIG. 22) in the body 192.

The cover 209 (see FIG. 20) has threaded passages 211 extending therethrough and equal in number to the number of the chambers 196. The gasket 208 has the same number of passages therein as the passages 211 and aligned therewith so that each of the chambers 196 in the body 192 can communicate through a separate line 212 and a three-way solenoid valve 213 with a single pressurized air source 214 for all of the chambers 196. Thus, the control of each of the solenoid valves 213 determines when each of the fingers 191 is extended to move the removal tape 56 (see FIG. 19) into engagement with the composite tape 15 (see FIG. 8) to remove one of the non-selected severed portions of the composite tape 15.

When there is no pressurized air supplied to the chamber 196 (see FIG. 20), a spring 215 rapidly returns the finger 191 to its retracted position in which it does not move the removal tape 56 (see FIG. 19) into engagement with the composite tape 15 (see FIG. 8).

Figure 27:
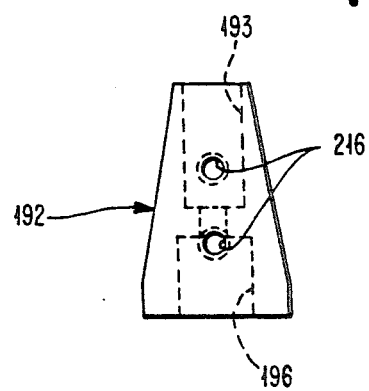
FIG. 27 is a side elevational view of one of the sides of the body of the finger assembly of FIG. 20.

The body 192 (see FIG. 20) is supported by the side swing brackets 62 (see FIG. 3) and 64. Each side of the body 192 (see FIG. 27) has a pair of threaded holes 216 therein. The body 192 is secured to the side swing bracket 64 (see FIG. 11) by screws extending through a slot 218 in the side swing bracket 64 and into the threaded holes 216 (see FIG. 27) in the body 192. The body 192 is similarly mounted on the side swing plate 62 (see FIG. 19) by screws 218'.

The removal tape 56 advances from the supply reel 57 over a round bar 219 prior to reaching the position at which the removal tape 56 is engaged by one or more of the fingers 191. The bar 219 is supported by the side swing brackets 62 (see FIG. 3) and 64 (see FIG. 11). The side swing bracket 64 has an opening 220 to receive one end of the bar 219 (see FIG. 19), which is fixed thereto by a screw (not shown), for example, extending into a threaded by a screw (not shown), for example, extending into a threaded hole in the end of the bar 219. The other end of the bar 219 is similarly connected to the side swing bracket 62 by a screw 220'.

The remainder of the structure of the composite tape laying machine 10 (see FIG. 1A) is the same as that described when using the contact roller 90 of FIG. 4 for applying the removal tape 56. When using the fingers 191 (see FIG. 19) rather than the contact roller 90 (see FIG. 4), the program for removing the non-selected severed portions 148 (see FIG. 14), 149, and 150 of the composite tape 15 would be changed to have the fingers 191 (see FIG. 20) selectively activated. However, none of the selected fingers 191 would be applied to the non-selected severed portions 148 (see FIG. 14), 149, and 150 of the composite tape 15 at any time other than when the contact roller 90 (see FIG. 4) is applied in the program described with respect to the composite tape 15 of FIG. 14.

Figure 30:
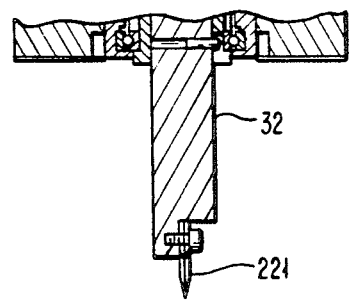
FIG. 30 is a fragmentary elevational view, partly in section, similar to a portion of FIG. 10, of a stylus cutter as the cutter used with the composite tape laying machine of FIGS. 9A and 9B.

While each of the cutters 34 (see FIG. 1A) and 151 has been shown and described as being a rotary cutter, it should be understood that any other suitable cutting means may be employed. For example, each of the cutters 34 and 151 could be replaced by a stylus cutter 221 (see FIG. 30), which would be mounted on an extension of the cylinder 32.

An advantage of this invention is that it prevents application of any non-selected severed portion of a composite tape to a mold or the like. Another advantage of this invention is that it insures removal of each non-selected severed portion of a composite tape from the backing. A further advantage of this invention is that it decreases the quantity of the composite tape that is scrapped. Still another advantage of this invention is that it minimizes the scrapped portions of the composite tape.

For purposes of exemplification, particular embodiments of the invention have been shown and described according to the best present understanding thereof. However, it will be apparent that changes and modifications in the arrangement and construction of the parts thereof may be resorted to without departing from the spirit and scope of the invention.

We claim:

1. A method for laying a composite tape on a mold from a tape assembly including a backing to which the composite tape is releasably adhered including:
   advancing a composite tape and a backing of a tape assembly from a supply source along a predetermined path;
   severing portions of the composite tape from each other without severing the backing;
   applying selected severed portions of the composite tape to a mold while the backing is advanced to storage means along the predetermined path after each selected severed portion of the composite tape has been applied to a mold;
   removing each non-selected severed portion of the composite tape from the backing after severing portions of the composite tape from each other and prior to the selected severed portions of the composite tape being applied to the mold by selectively moving a material having a greater adherence to the composite tape than the backing into and out of engagement with each non-selected severed portion of the composite tape;
   and advancing the material of greater adherence so that there is no relative movement between the material of greater adherence and the composite tape when the material of greater adherence is moved into engagement with each non-selected severed portion of the composite tape.

2. The method according to claim 1 including moving the material of greater adherence into engagement with each non-selected severed portion of the composite tape at the start of each non-selected severed portion of the composite tape and out of engagement prior to the end of each non-selected severed portion of the composite tape.

3. The method according to claim 2 including moving the material of greater adherence out of engagement with each non-selected severed portion of the composite tape having a varying width each time that the non-selected severed portion of the composite tape reaches its maximum width after the material of greater adherence is moved into engagement with the non-selected severed portion of the composite tape.

4. The method according to claim 2 including moving the material of greater adherence out of engagement with each non-selected severed portion of the composite tape no later than one half of the length of the non-selected severed portion of the composite tape when the non-selected severed portion of the composite tape has a constant width after the material of greater adherence is moved into engagement with the non-selected severed portion of the composite tape.

5. The method according to claim 1 including disposing an element having a curved surface tangent to the backing at a fixed position along the predetermined path when the backing engages the curved surface and moving the material of greater adherence into engagement with each non-selected severed portion of the composite tape so that the backing is held against the curved surface of the element during engagement of the material of greater adherence with each non-selected severed portion of the composite tape.

6. The method according to claim 1 including moving the material of greater adherence into and out of engagement with the entire width of the composite tape.

7. The method according to claim 1 including selectively moving the material of greater adherence into and out of engagement only with each non-selected severed portion of the composite tape with a force applied only to the width of the material of greater adherence corresponding to the width of each non-selected severed portion of the composite tape.

* * * * *